United States Patent
Go et al.

(10) Patent No.: US 12,047,175 B2
(45) Date of Patent: Jul. 23, 2024

(54) METHOD AND DEVICE FOR TRANSMITTING AND RECEIVING SOUNDING REFERENCE SIGNAL IN WIRELESS COMMUNICATION SYSTEM

(71) Applicant: LG ELECTRONICS INC., Seoul (KR)

(72) Inventors: Seongwon Go, Seoul (KR); Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/610,269

(22) PCT Filed: May 11, 2020

(86) PCT No.: PCT/KR2020/006168
§ 371 (c)(1),
(2) Date: Nov. 10, 2021

(87) PCT Pub. No.: WO2020/231125
PCT Pub. Date: Nov. 19, 2020

(65) Prior Publication Data
US 2022/0224444 A1 Jul. 14, 2022

Related U.S. Application Data

(60) Provisional application No. 62/887,632, filed on Aug. 15, 2019, provisional application No. 62/845,953, filed on May 10, 2019.

(51) Int. Cl.
*H04L 1/1607* (2023.01)
*H04L 5/00* (2006.01)
*H04L 27/26* (2006.01)

(52) U.S. Cl.
CPC .......... *H04L 1/1642* (2013.01); *H04L 5/0012* (2013.01); *H04L 5/0051* (2013.01); *H04L 27/2607* (2013.01)

(58) Field of Classification Search
CPC .......................... H04L 1/1642; H04L 27/2607
See application file for complete search history.

(56) References Cited

U.S. PATENT DOCUMENTS

2017/0302419 A1* 10/2017 Liu ................. H04L 5/0082
2019/0124643 A1    4/2019 Qin et al.
(Continued)

FOREIGN PATENT DOCUMENTS

| KR | 101752918 | 7/2017 |
| KR | 20180123503 | 11/2018 |
| KR | 101944829 | 2/2019 |

OTHER PUBLICATIONS

Huawei, HiSilicon, "Introduction of additional SRS symbols in normal UL subframe," R1-1906069, 3GPP TSG RAN WG1 Meeting #97, Reno, USA, May 13-17, 2019, 7 pages.
(Continued)

*Primary Examiner* — Jackie Zuniga Abad
(74) *Attorney, Agent, or Firm* — Fish & Richardson P.C.

(57) ABSTRACT

A method for transmitting a sounding reference signal (SRS) by means of a terminal in a wireless communication system, according to one embodiment of the present specification, comprises: a step of receiving configuration information related to a transmission of an SRS; and a step of transmitting the SRS. The method is characterized in that the SRS is configured in a region comprising at least one symbol excluding the last symbol of a subframe, the region comprises a certain number of guard symbols, and the guard symbols are related to at least one of frequency hopping or antenna switching of the SRS.

11 Claims, 16 Drawing Sheets

(56) References Cited

U.S. PATENT DOCUMENTS

2020/0322187 A1* 10/2020 He ................... H04L 5/0055
2021/0250943 A1*  8/2021 Rico Alvarino ...... H04L 5/0048
2022/0006588 A1*  1/2022 Wang ............... H04W 72/0446

OTHER PUBLICATIONS

Intel Corp., "Remaining details for additional SRS," R1-1906776, 3GPP TSG RAN WG1 #97, Reno, USA, May 13-17, 2019, 3 pages.

Lenovo, Motorola Mobility, "Discussion of additional SRS symbols," R1-1906273, 3GPP TSG RAN WG1, Meeting #97, Reno, USA, May 13-17, 2019, 6 pages.

PCT International Search Report issued in International Application No. PCT/KR2020/006168, dated Aug. 25, 2020, 5 pages.

ZTE, "Discussion on additional SRS symbols," R1-1906256, 3GPP TSG RAN WG1 Meeting #97, Reno, USA May 13-17, 2019, 3 pages.

ETSI, LTE; Evolved Universal Terrestrial Radio Access (E-UTRA); Physical layer procedures (3GPP TS 36.213 version 8.8.0 Release 8), TS 136 213 V8.8.0, Oct. 2009, 79 pages.

Extended European Search Report in European Appln. No. 20806512.8, dated Jun. 7, 2022, 10 pages.

Huawei & HiSilicon, "Summary of remaining details of SRS design," R1-1800090, Presented at 3GPP TSG RAN WG1 Ad Hoc Meeting, Vancouver, Canada, Jan. 22-26, 2018, 12 pages.

LG Electronics, "Summary of Issues on UE-UE CLI measurements and Network Coordination Mechanism," R1-1903452, Presented at 3GPP TSG RAN WG1 Meeting #96, Athens, Greece, Feb. 12-16, 2019, 28 pages.

LG Electronics, "Discussion on additional SRS symbols," R1-1906716, Presented at 3GPP TSG RAN WG1 Meeting #97, Reno, USA, May 13-17, 2019, 6 pages.

Qualcomm Incorporated, "Additional SRS symbols," R1-1907006, Presented at 3GPP TSG-RAN WG1 #97, Reno, USA, May 13-17, 2019, 10 pages.

Office Action in Korean Appln. No. 10-2020-0055980, dated Aug. 4, 2020, 14 pages (with English translation).

Notice of Allowance in Korean Appln. No. 10-2020-0055980, dated Dec. 4, 2020, 4 pages (with English translation).

* cited by examiner

[FIG. 1]
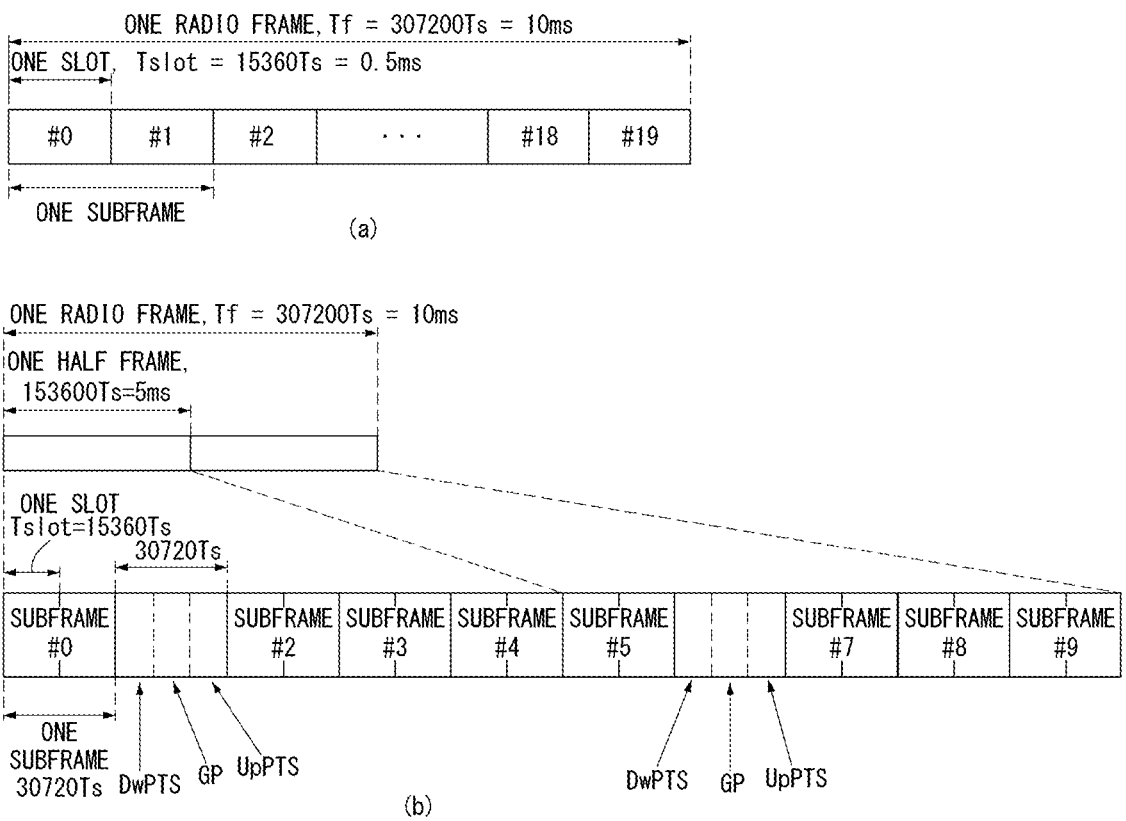

[FIG. 2]
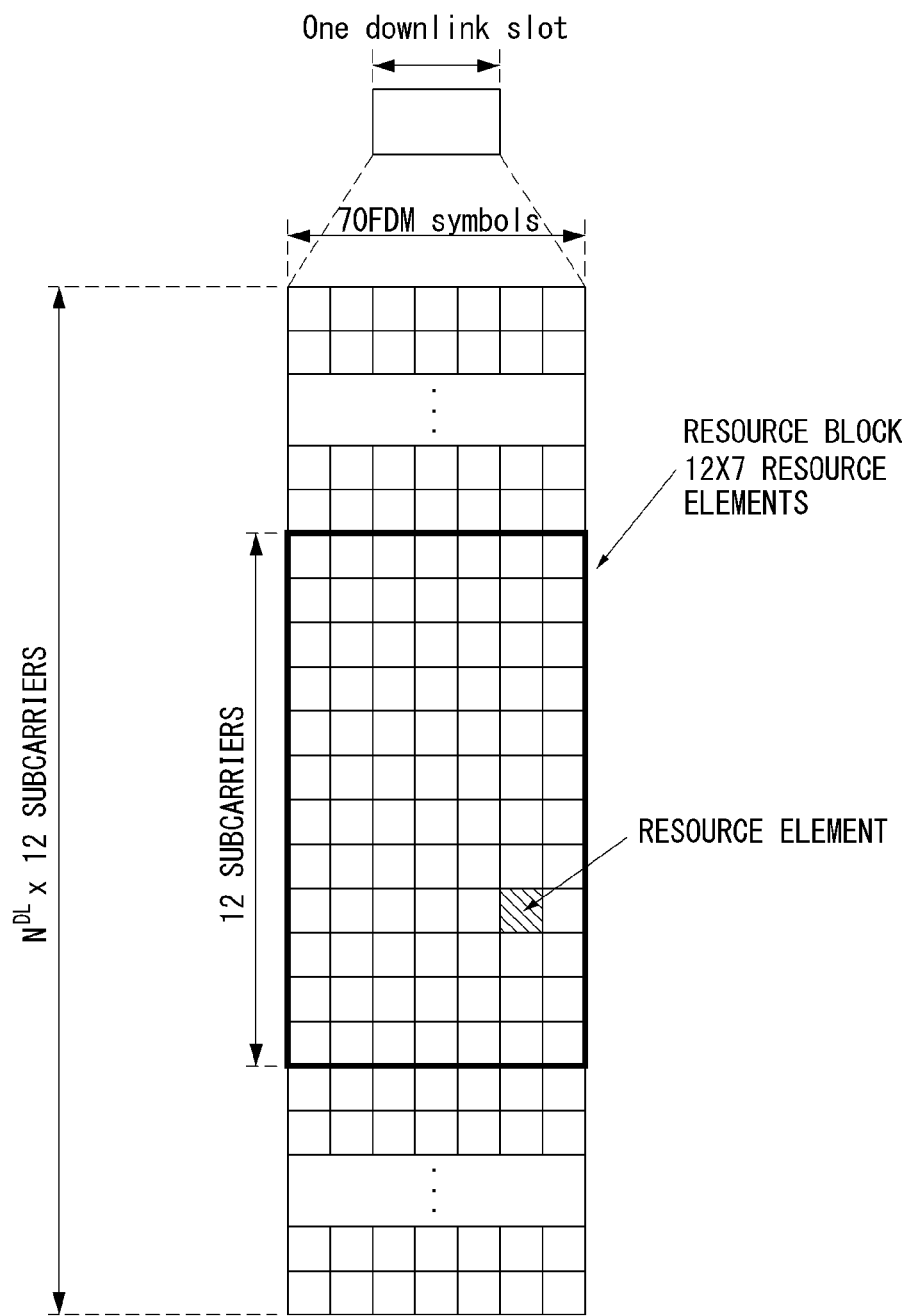

[FIG. 3]
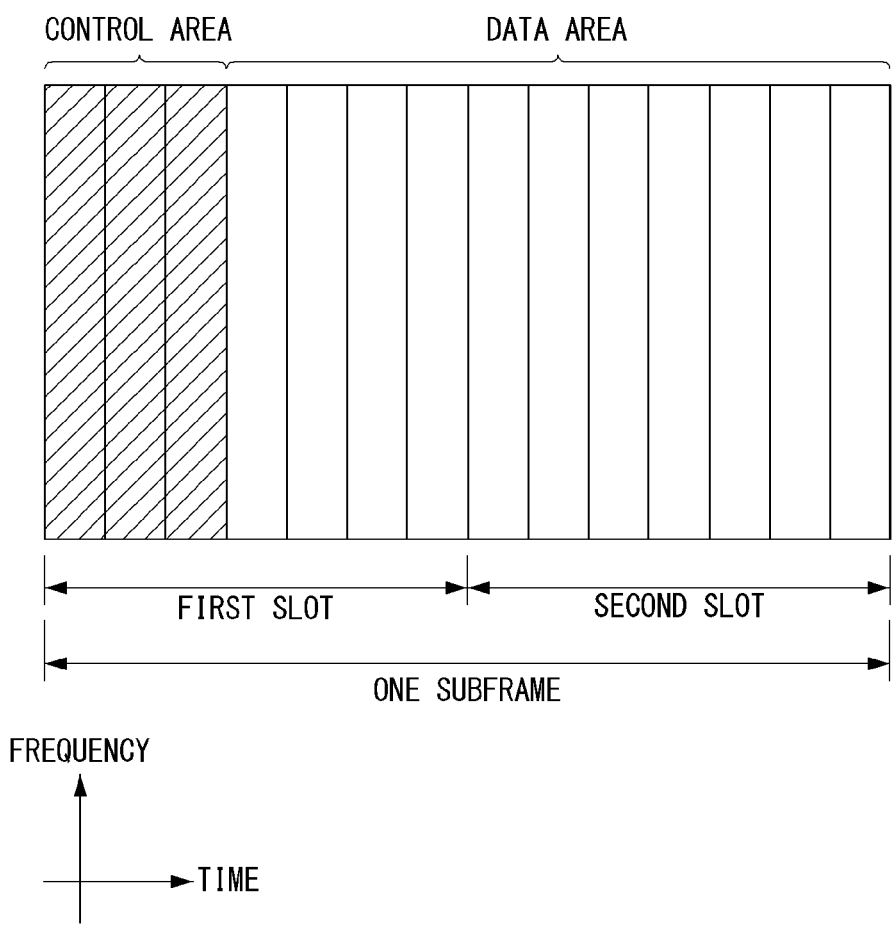

[FIG. 4]
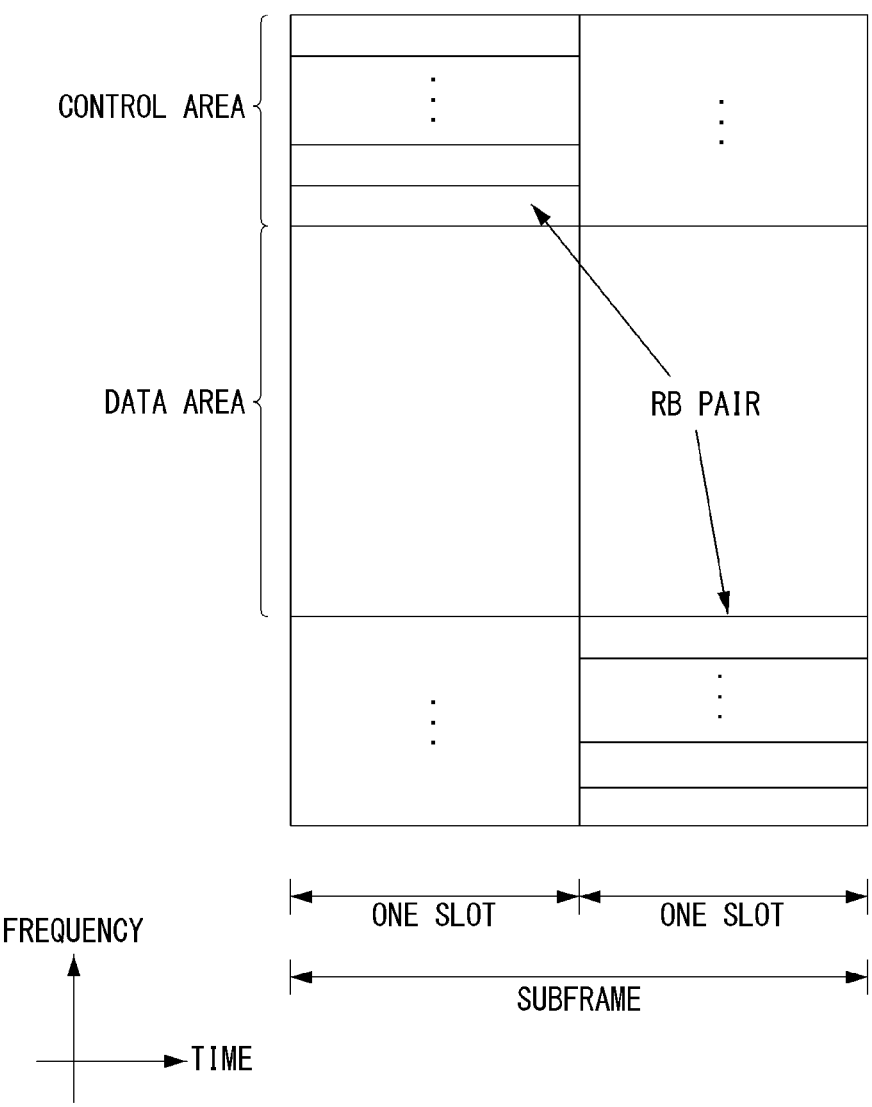

[FIG. 5]
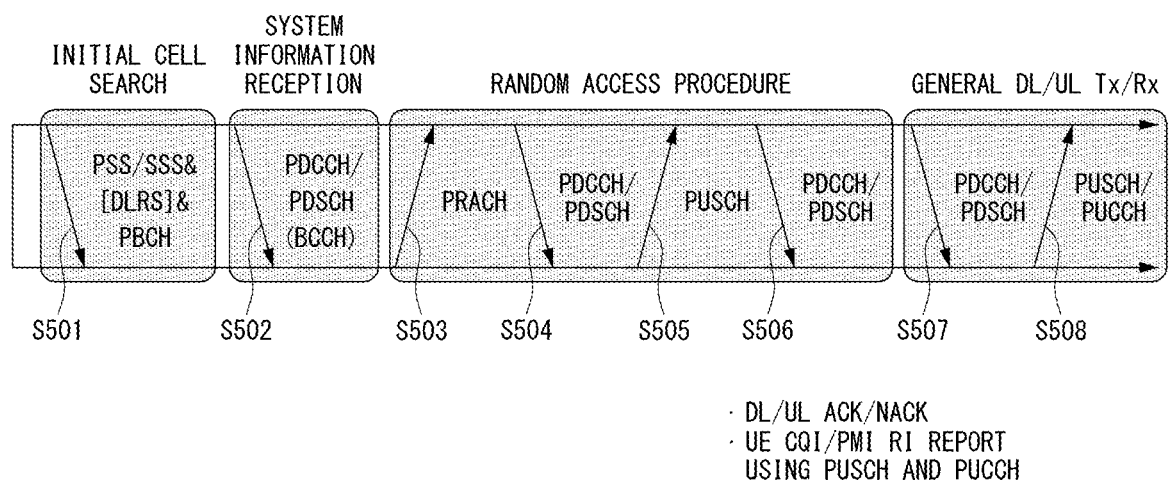

[FIG. 6]
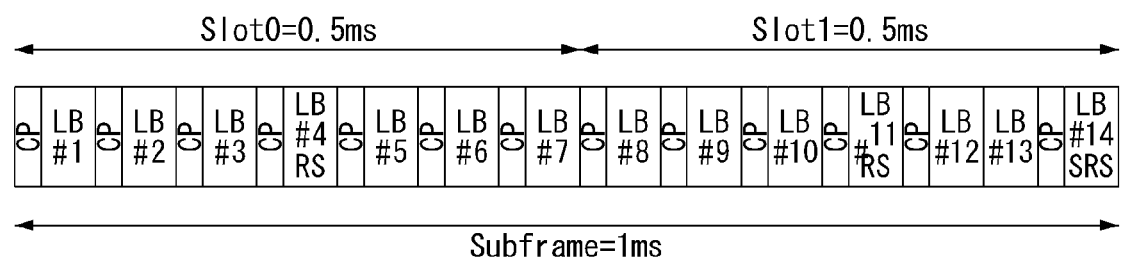

[FIG. 7]
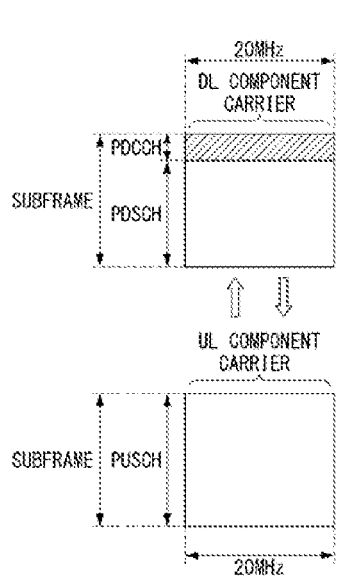
(a) SINGLE CC
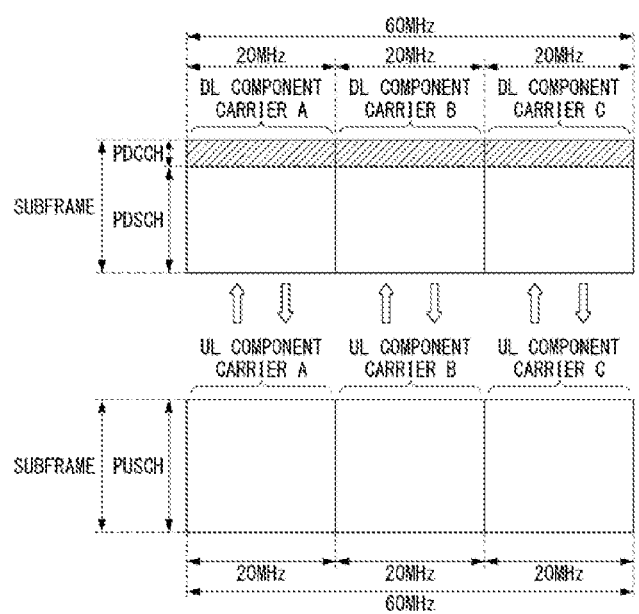
(b) MULTIPLE CC

[FIG. 8]
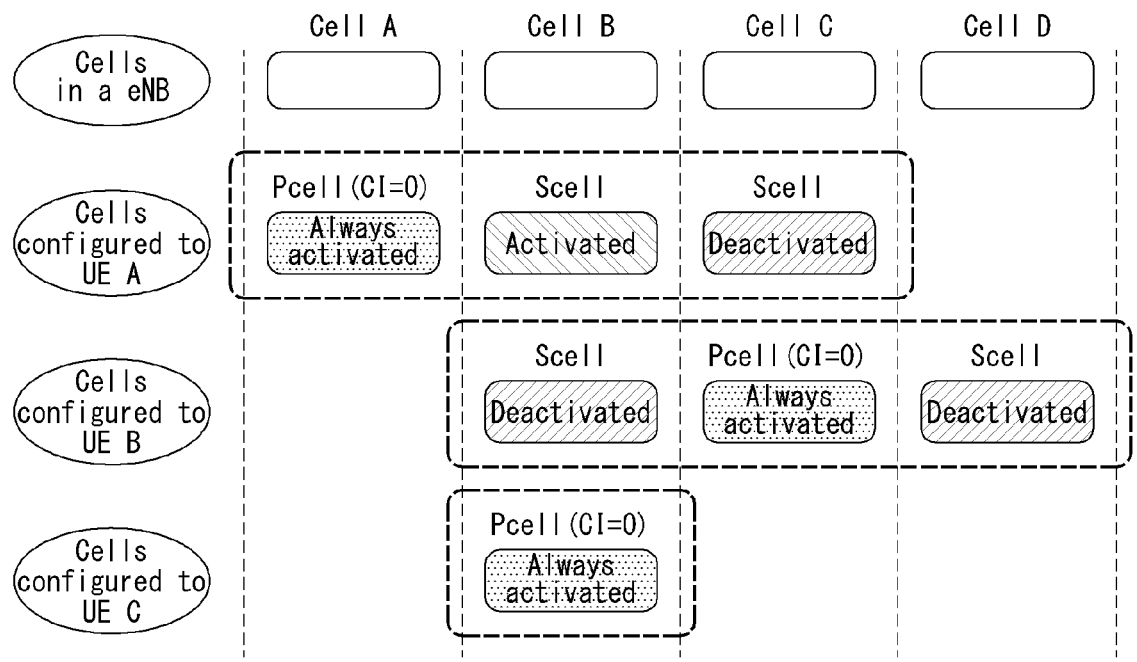

[FIG. 9]
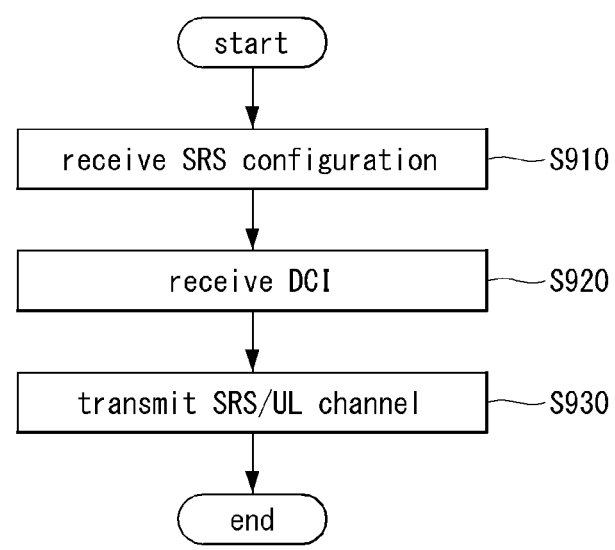

[FIG. 10]
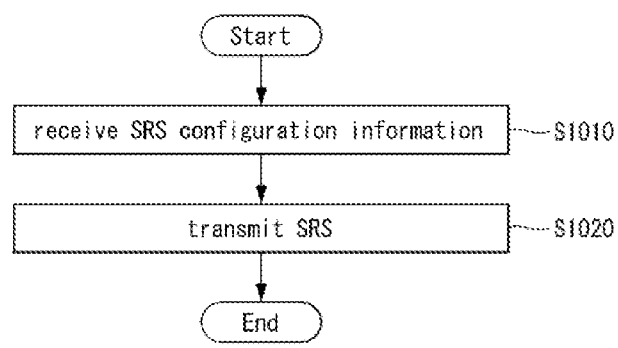

[FIG. 11]
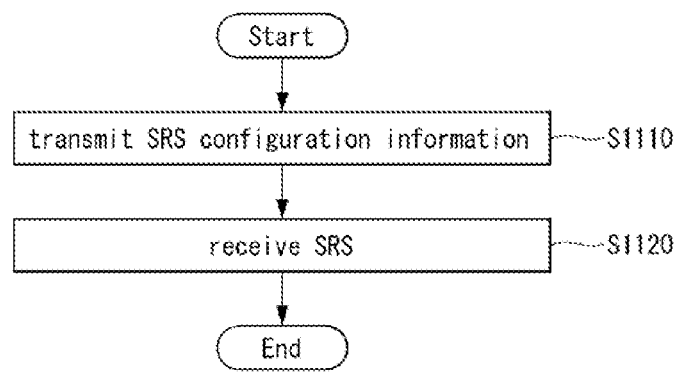

[FIG. 12]
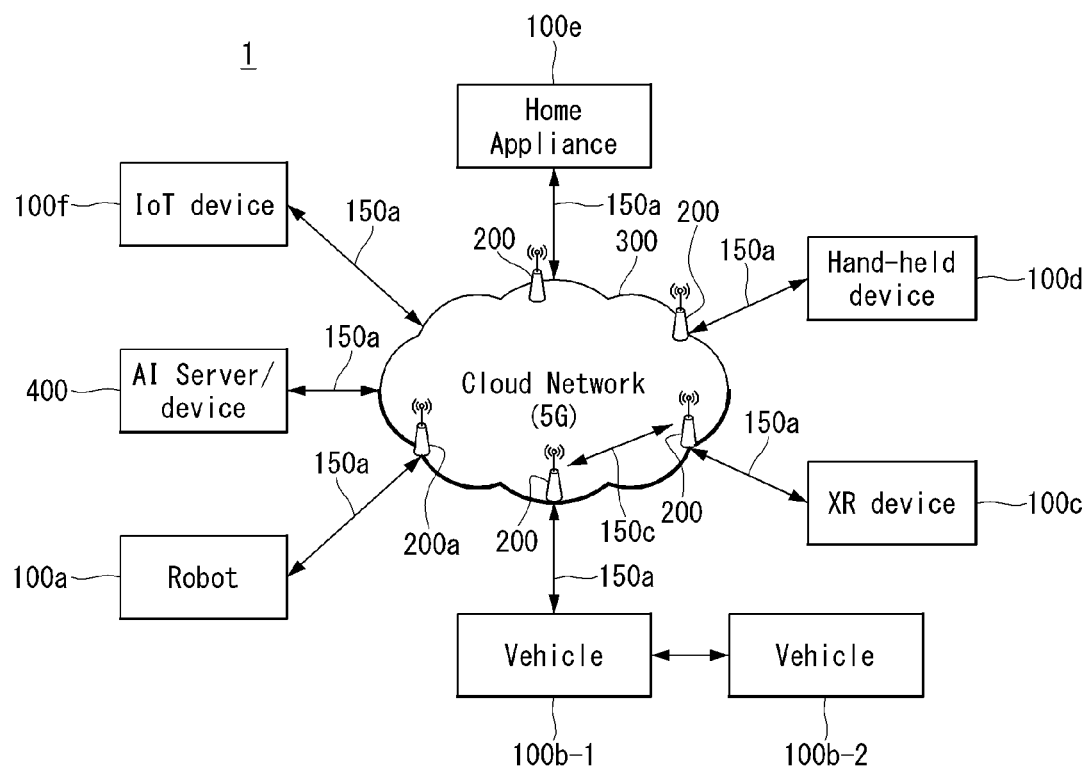

[FIG. 13]
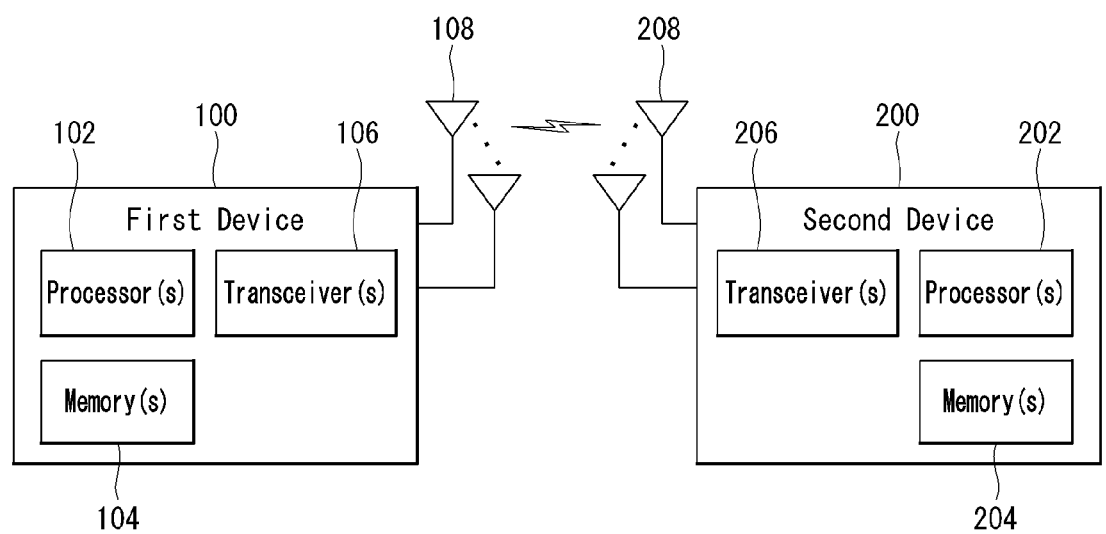

[FIG. 14]
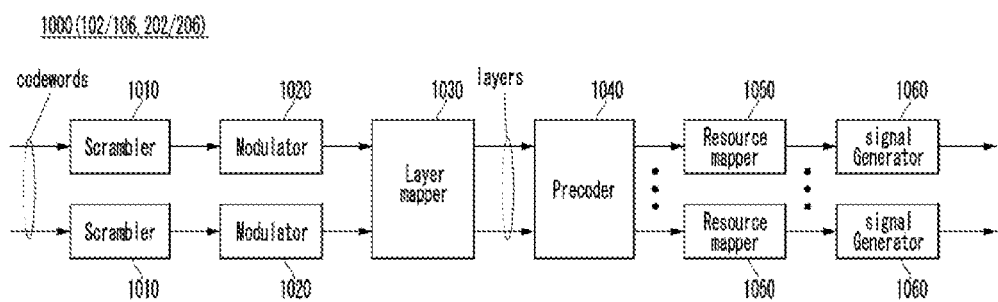

[FIG. 15]
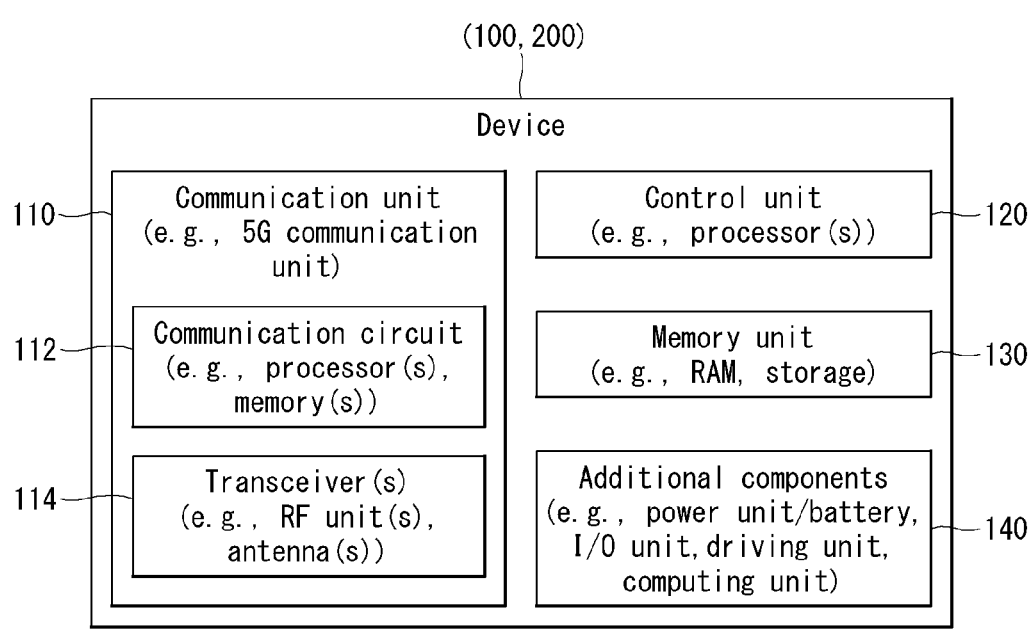

[FIG. 16]
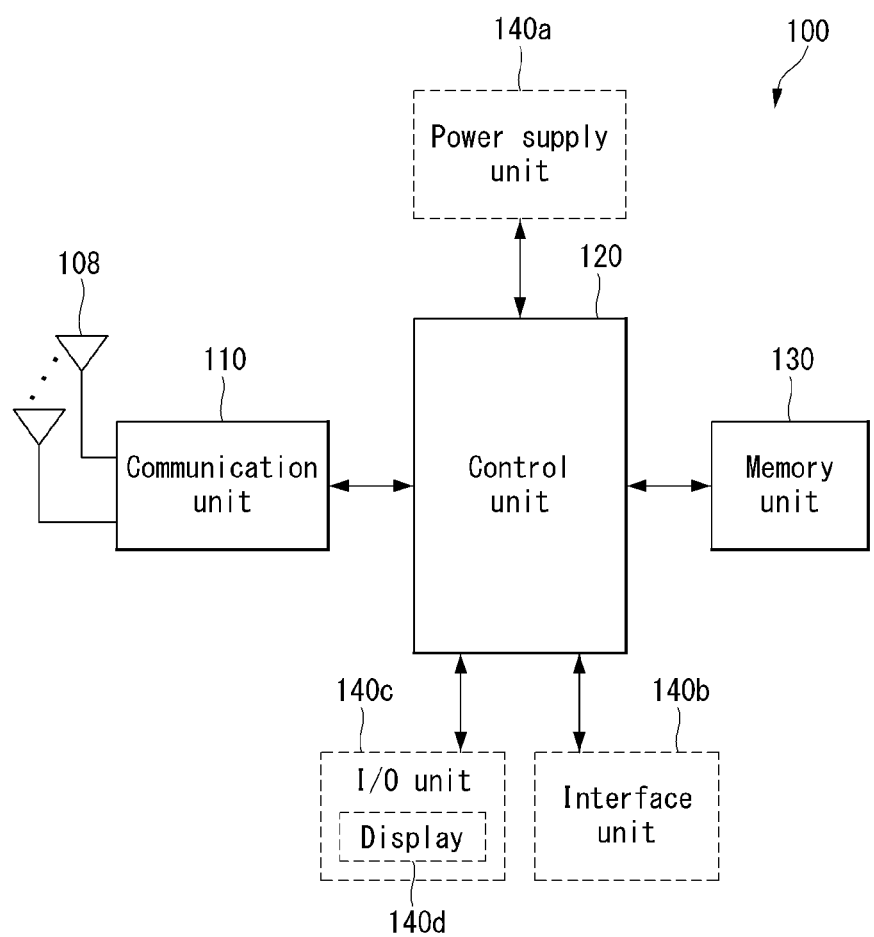

METHOD AND DEVICE FOR TRANSMITTING AND RECEIVING SOUNDING REFERENCE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2020/006168, filed on May 11, 2020, which claims the benefit of U.S. Provisional Application No. 62/845,953, filed on May 10, 2019, and U.S. Provisional Application No. 62/887,632, filed on Aug. 15, 2019, the contents of which are all hereby incorporated by reference herein in their entirety.

TECHNICAL FIELD

The present disclosure relates to a method and apparatus for transmitting and receiving sounding reference signals in a wireless communication system.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

The present disclosure proposes a method of transmitting a sounding reference signal (SRS). Specifically, if both an antenna switching operation and a frequency hopping operation are configured in relation to the transmission of an SRS, an SRS may not be transmitted with respect to the same hopping band and an SRS may be transmitted with respect to different hopping bands for each antenna port. Accordingly, the present disclosure proposes an SRS transmission method capable of solving the aforementioned problem.

Objects of the disclosure are not limited to the foregoing, and other unmentioned objects would be apparent to one of ordinary skill in the art from the following description.

Technical Solution

A method of transmitting, by a UE, a sounding reference signal (SRS) in a wireless communication system according to an embodiment of the present disclosure includes receiving configuration information related to the transmission of a sounding reference signal (SRS) and transmitting the SRS.

The SRS is configured in a region comprised of at least one symbol other than a last symbol of a subframe, the region includes a specific number of guard symbols, and the guard symbol is related to at least one of frequency hopping or antenna switching of the SRS.

The specific number may be determined based on at least one of the frequency hopping or the antenna switching.

The transmission number of the SRS may be determined based on a factor related to a repetition of the SRS and a specific symbol index.

The specific symbol index may be related to symbols except the specific number of guard symbols among symbols within the region.

The frequency hopping or the antenna switching may be performed based on the transmission number.

The frequency hopping may be performed earlier than the antenna switching.

The antenna switching may be performed based on at least one of the transmission number or a number of the frequency hopping performed on a bandwidth in which the transmission of the SRS is configured.

The configuration information may include information related to the region, and the information related to the region may include information on at least one of the number of symbols or a location of a symbol.

The number of symbols or the location of the symbol may be related to at least one of a symbol in which the SRS is transmitted or the guard symbol.

The method may further include transmitting UE capability information related to whether to configure the guard symbol.

A UE transmitting a sounding reference signal (SRS) in a wireless communication system according to another embodiment of the present disclosure includes one or more transceivers, one or more processors controlling the one or more transceivers, and one or more memories capable of being operately connected to the one or more processors and storing instructions which perform operations when a transmission of a sound reference signal is executed by the one or more processors.

The operations include receiving configuration information related to transmission of a sounding reference signal (SRS), and transmitting the SRS.

The SRS is configured in a region comprised of at least one symbol other than a last symbol of a subframe, the region includes a specific number of guard symbols, and the guard symbol is related to at least one of frequency hopping or antenna switching of the SRS.

The apparatus according to still another embodiment of the present disclosure includes one or more memories and one or more processors operately coupled to the one or more memories.

The one or more processors are configured to enable the apparatus to receive configuration information related to a transmission of a sounding reference signal (SRS) and to transmit the SRS.

The SRS is configured in a region comprised of at least one symbol other than a last symbol of a subframe, the region includes a specific number of guard symbols, and the guard symbol is related to at least one of frequency hopping or antenna switching of the SRS.

One or more non-transitory computer-readable media according to still another embodiment of the present disclosure store one or more instructions.

The one or more instructions executable by one or more processors enable a user equipment to receive configuration information related to transmission of a sounding reference signal (SRS) and to transmit the SRS.

The SRS is configured in a region comprised of at least one symbol other than a last symbol of a subframe, the region includes a specific number of guard symbols, and the guard symbol is related to at least one of frequency hopping or antenna switching of the SRS.

A method of receiving, by a base station, a sounding reference signal (SRS) in a wireless communication system according to still another embodiment of the present disclosure includes transmitting configuration information related to a transmission of a sounding reference signal (SRS) and receiving the SRS.

The SRS is configured in a region comprised of at least one symbol other than a last symbol of a subframe, the region includes a specific number of guard symbols, and the guard symbol is related to at least one of frequency hopping or antenna switching of the SRS.

A base station receiving an uplink signal in a wireless communication system according to still another embodiment of the present disclosure includes one or more transceivers, one or more processors controlling the one or more transceivers, and one or more memories capable of being operately connected to the one or more processors and storing instructions which perform operations when a reception of a sounding reference signal is executed by the one or more processors.

The operations include transmitting configuration information related to a transmission of a sounding reference signal (SRS) and receiving the SRS.

The SRS is configured in a region comprised of at least one symbol other than a last symbol of a subframe, the region includes a specific number of guard symbols, and the guard symbol is related to at least one of frequency hopping or antenna switching of the SRS.

Advantageous Effects

According to an embodiment of the present disclosure, a region in which the transmission of an SRS is configured includes a specific number of guard symbols. The guard symbol can be related to at least one of frequency hopping or antenna switching. If frequency hopping and antenna switching operation is configured through the configuration of the guard symbols, ambiguity can be removed in terms of a UE operation. Furthermore from a multi-UE viewpoint, there are effects in that an SRS capacity can be guaranteed and an SRS-transmittable range between UEs is not invaded.

According to an embodiment of the present disclosure, the transmission number of an SRS can be determined based on a factor related to the repetition of the SRS and a specific symbol index. The specific symbol index can be related to symbols except a specific number of guard symbols among symbols within the region. The frequency hopping or the antenna switching can be performed based on the transmission number. The frequency hopping can be performed earlier than the antenna switching. The antenna switching can be performed based on at least one of the transmission number or the number of the frequency hopping performed on a bandwidth in which the transmission of the SRS is configured.

Accordingly, frequency hopping or antenna switching can be performed based on the transmission number of an SRS. Furthermore, the accuracy of DL CSI acquisition can be improved because an antenna switching operation is maintained at the same antenna port while frequency hopping is performed in association with the number of the frequency hopping. Since a frequency hopping/repetition operation is completed prior to antenna switching, a guard symbol attributable to the antenna switching can be minimized and the waste of resources can be reduced.

According to an embodiment of the present disclosure, UE capability information related to the configuration of a guard symbol can be transmitted. Whether to configure a guard symbol can be determined based on the capability of a corresponding UE. Accordingly, resources can be reduced because a guard symbol is not configured with respect to a UE having a poor capability, and the deterioration of an SRS transmission symbol attributable to a power transient period can be prevented because a guard symbol is configured with respect to a UE not having a poor capability.

Effects of the disclosure are not limited to the foregoing, and other unmentioned effects would be apparent to one of ordinary skill in the art from the following description.

DESCRIPTION OF DRAWINGS

FIG. 1 shows the structure of a radio frame in a wireless communication system to which a method proposed in the disclosure may be applied.

FIG. 2 is a diagram illustrating a resource grid for one downlink slot in a wireless communication system to which a method proposed in the disclosure may be applied.

FIG. 3 shows the structure of a downlink subframe in a wireless communication system to which a method proposed in the disclosure may be applied.

FIG. 4 shows the structure of an uplink subframe in a wireless communication system to which a method proposed in the disclosure may be applied.

FIG. 5 illustrates physical channels and general signal transmission used in a 3GPP system.

FIG. 6 illustrates an uplink subframe including an SRS in a wireless communication system to which a method proposed in the disclosure may be applied.

FIG. 7 illustrates one example of a component carrier and carrier aggregation in a wireless communication system to which a method proposed in the disclosure may be applied.

FIG. 8 illustrates an example the distinguishment of cells in a system supporting carrier aggregation, to which a method proposed in the disclosure may be applied.

FIG. 9 is a flowchart for describing the operation of a UE to which a method proposed in the disclosure may be applied.

FIG. 10 is a flowchart for describing a method of transmitting, by a UE, a sounding reference signal in a wireless communication system according to an embodiment of the present disclosure.

FIG. 11 is a flowchart for describing a method of receiving, by a base station, a sounding reference signal in a wireless communication system according to another embodiment of the present disclosure.

FIG. 12 illustrates a communication system 1 applied to the present disclosure.

FIG. 13 illustrates a wireless device which may be applied to the present disclosure.

FIG. 14 illustrates a signal processing circuit applied to the present disclosure.

FIG. 15 illustrates another example of a wireless device applied to the present disclosure.

FIG. 16 illustrates a portable device applied to the present disclosure.

MODE FOR DISCLOSURE

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the disclosure should be construed to extend to any alterations, equivalents and substitutes in addition to those which are particularly set out in the accompanying drawings.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

General System

FIG. 1 shows the structure of a radio frame in a wireless communication system to which a method proposed in the disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

(a) of FIG. 1 exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

(b) of FIG. 1 shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| Special | | UpPTS | | | UpPTS | |
| subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which a method proposed in the disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the disclosure is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which a method proposed in the disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which a method proposed in the disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Physical Channel and General Signal Transmission

FIG. 5 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S501). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S502).

Meanwhile, when there is no radio resource first accessing the eNB or for signal transmission, the UE may perform a Random Access Procedure (RACH) to the eNB (S503 to S506). To this end, the UE may transmit a specific sequence to a preamble through a Physical Random Access Channel (PRACH) (S503 and S505) and receive a response message (Random Access Response (RAR) message) for the preamble through the PDCCH and a corresponding PDSCH. In the case of a contention based RACH, a Contention Resolution Procedure may be additionally performed (S506).

The UE that performs the above procedure may then perform PDCCH/PDSCH reception (S507) and Physical Uplink Shared Channel (PUSCH)/Physical Uplink Control Channel (PUCCH) transmission (S508) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Sounding Reference Signal (SRS)

An SRS is mainly used for channel quality measurement to perform uplink frequency-selective scheduling and is not related to transmission of uplink data and/or control information. However, the disclosure is not limited thereto and the SRS may be used for various other purposes to enhance power control or to support various start-up functions of recently unscheduled terminals. As an example of the start-up function, an initial modulation and coding scheme (MCS), initial power control for data transmission, timing advance, and frequency semi-selective scheduling may be included. In this case, frequency semi-selective scheduling refers to scheduling that selectively allocates frequency resources to a first slot of a subframe and allocating the frequency resources by pseudo-randomly jumping to another frequency in a second slot.

Further, the SRS may be used for measuring a downlink channel quality under the assumption that radio channels are reciprocal between the uplink and the downlink. The assumption is particularly effective in a time division duplex (TDD) system in which the uplink and the downlink share the same frequency spectrum and are separated in a time domain.

The SRS subframes transmitted by a certain UE in a cell may be represented by a cell-specific broadcast signal. A 4 bit cell-specific 'srsSubframeConfiguration' parameter represents 15 available subframe arrays through which the SRS may be transmitted over each radio frame. The arrays provide flexibility for adjustment of SRS overhead according to a deployment scenario.

A 16-th array completely turns off a switch of the SRS in the cell and this is primarily suitable for a serving cell that serves high-speed terminals.

FIG. 6 illustrates an uplink subframe including an SRS in a wireless communication system to which a method proposed in the disclosure may be applied.

Referring to FIG. 6, the SRS is continuously transmitted on the last SC-FDMA symbol on the arranged subframe. Therefore, the SRS and the DMRS are located in different SC-FDMA symbols.

PUSCH data transmission is not allowed in a specific SC-FDMA symbol for SRS transmission and as a result, when the sounding overhead is the highest, that is, even if SRS symbols are included in all subframes, the sounding overhead does not exceed approximately 7%.

Each SRS symbol is generated by a basic sequence (random sequence or a sequence set based on Zadoff-Ch (ZC)) for a given time unit and frequency band, and all terminals in the same cell use the same basic sequence. In this case, the SRS transmissions from a plurality of UEs in the same cell at the same time in the same frequency band are orthogonal by different cyclic shifts of the basic sequence, and are distinguished from each other.

By assigning different basic sequences to respective cells, the SRS sequences from different cells may be distinguished, but orthogonality between different basic sequences is not guaranteed.

SRS Transmission in NR System

In NR systems, an SRS sequence for SRS resources may be generated by Equation 1 below.

$$r^{(p_i)}(n, l') = r_{u,v}^{(\alpha_i,\delta)}(n) \quad \text{[Equation 1]}$$

$$0 \le n \le 271 \cdot N_{sc}^{RB}/K_{TC}$$

$$l' \in \{0, 1, \ldots, N_{symb}^{SRS} - 1\}$$

In Equation 1, $r_{u,v}^{(\alpha_i,\delta)}(n)$ denotes the sequence number (v) of SRS and the sequence set by the sequence group (u), and the transmission comb (TC) number, $K\_TC(^{K_{TC}})$, may be included in the higher layer parameter, SRS-Transmission-Comb.

Further, for antenna port $p_i$, the cyclic shift (SC) $\alpha_i$ may be given as in Equation 2 below.

$$\alpha_i = 2\pi \frac{n_{SRS}^{cs,i}}{n_{SRS}^{cs,max}} \quad \text{[Equation 2]}$$

$$n_{SRS}^{cs,i} = \left(n_{SRS}^{cs} + \frac{n_{SRS}^{cs,max} p_i}{N_{ap}}\right) \mod n_{RS}^{cs,max}$$

In Equation 2, $n_{SRS}^{cs} \in \{0, 1, \ldots, n_{SRS}^{cs,max}\}$ may be given by the higher layer parameter SRS-CyclicShiftConFIG. Further, the maximum value of the cyclic shift, if K_TC is 4, may be 12 (i.e., $n_{SRS}^{cs,max}=12$) and, if K_TC is 2, 8 (i.e., $n_{SRS}^{cs,max}=8$).

The sequence group $(u)(u=(f_{gh}(n_{s,f}^\mu,l')+n_{ID}^{SRS} \mod 30) \mod 30)$ and the sequence number (u) may comply with the higher layer parameter SRS-GroupSequenceHopping. Further, the SRS sequence identifier $n_{ID}^{SRS}$ may be given by the higher layer parameter SRS-SequenceId. l' (i.e., l'∈{0, 1, . . . , $N_{symb}^{SRS}-1$}) denotes the OFDM symbol number in the SRS resource.

At this time, if SRS-GroupSequenceHopping is 0, group hopping and sequence hopping are not used, which may be represented as in Equation 3 below.

$$f_{gh}(n_{s,f}^\mu, l') = 0 \quad \text{[Equation 3]}$$

$$v = 0$$

In Equation 3, f_gh(x, y) denotes sequence group hopping, and v denotes sequence hopping.

Or, if SRS-GroupSequenceHopping is 1, group hopping, not sequence hopping, is used, and this may be expressed as in Equation 4.

$$f_{gh}(n_{s,f}, l') = \left(\sum_{m=0}^{7} c(8(n_{s,f}^\mu N_{symb}^{SRS} + l') + m) \cdot 2^m\right) \mod 30 \quad \text{[Equation 4]}$$

$$v = 0$$

In Equation 4, f_gh(x, y) denotes sequence group hopping, and v denotes sequence hopping. c(i) denotes the pseudo-random sequence and may be initialized as $c_{init}=\lfloor n_{ID}^{SRS}/30 \rfloor$ at the start of each radio frame.

Or, if SRS-GroupSequenceHopping is 2, sequence hopping, not group hopping, is used, and this may be expressed as in Equation 5.

$$f_{gh}(n_{s,f}, l') = 0 \quad \text{[Equation 5]}$$

$$v = \begin{cases} c(n_{s,f} N_{symb}^{SRS} + l') & M_{sc,b}^{SRS} \geq 3N_{sc}^{RB} \\ 0 & \text{otherwise} \end{cases}$$

In Equation 5, f_gh(x, y) denotes sequence group hopping, and v denotes sequence) hopping. c(i) denotes the pseudo-random sequence and may be initialized as $c_{init} = \lfloor n_{ID}^{SRS}/30 \rfloor \cdot 2^5 + (n_{ID}^{SRS} + \Delta_{ss}) \bmod 30$ at the start of each radio frame (where, $\Delta_{ss} \in \{0, 1, \ldots, 29\}$).

Sounding Reference Signal (SRS) Hopping

SRS hopping may be performed only upon periodic SRS triggering (e.g., triggering type 0). Further, allocation of SRS resources may be provided according to a pre-defined hopping pattern. In this case, the hopping pattern may be designated UE-specifically via higher layer signaling (e.g., RRC signaling) and no overlap is allowed.

Further, SRS is frequency-hopped using the hopping pattern in every subframe where cell-specific and/or UE-specific SRS is transmitted, and the start position and hopping equation in the frequency domain of SRS hopping may be interpreted via Equation 6 below.

$$\bar{k}_0^{(p)} = \bar{k}_0^{(p)} + \sum_{b=0}^{B_{SRS}} K_{TC} M_{sc,b}^{RS} n_b \quad \text{[Equation 6]}$$

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2) \left\lfloor \frac{n_{SRS} \bmod \Pi_{b'=b_{hop}}^b N_{b'}}{\Pi_{b'=b_{hop}}^{b-1} N_{b'}} \right\rfloor + \\ \left\lfloor \frac{n_{SRS} \bmod \Pi_{b'=b_{hop}}^b N_{b'}}{2\Pi_{b'=b_{hop}}^{b-1} N_{b'}} \right\rfloor & \text{if } N_b \text{ even} \\ \lfloor N_b/2 \rfloor \lfloor n_{SRS}/\Pi_{b'=b_{hop}}^{b-1} N_{b'} \rfloor & \text{if } N_b \text{ odd} \end{cases}$$

$$n_{SRS} = \begin{cases} 2N_{SP}n_f + 2(N_{SP} - 1)\left\lfloor \frac{n_s}{10} \right\rfloor + \left\lfloor \frac{T_{offset}}{T_{offset\_max}} \right\rfloor, \\ \text{for 2 ms SRS periodicity} \\ \text{of frame structure type 2} \\ \lfloor (n_f \times 10 + \lfloor n_s/2 \rfloor)/T_{SRS} \rfloor, \quad \text{otherwise} \end{cases}$$

In Equation 6, nSRS means the hopping interval in the time domain, and Nb denotes the number of branches allocated to tree level b where b may be determined by the BSRS configuration in the dedicated RRC.

FIG. 7 illustrates one example of a component carrier and carrier aggregation in a wireless communication system to which a method proposed in the disclosure may be applied.

(a) of FIG. 7 shows a single carrier structure defined in the LTE system. Two types of component carriers are used: DL CC and UL CC. A component carrier may have frequency bandwidth of 20 MHz.

(b) of FIG. 7 shows a carrier aggregation structure used in the LTE A system. (b) of FIG. 7 shows a case where three component carriers having frequency bandwidth of 20 MHz are aggregated. In this example, 3 DL CCs and 3 UL CCs are employed, but the number of DL CCs and UL CCs is not limited to the example. In the case of carrier aggregation, the UE is capable of monitoring 3 CCs at the same time, capable of receiving a downlink signal/data and transmitting an uplink signal/data.

If a particular cell manages N DL CCs, the network may allocate M (M≤N) DL CCs to the UE. At this time, the UE may monitor only the M DL CCs and receive a DL signal from the M DL CCs. Also, the network may assign priorities for L (L≤M≤N) DL CCs so that primary DL CCs may be allocated to the UE; in this case, the UE has to monitor the L DL CCs. This scheme may be applied in the same manner to uplink transmission.

Linkage between a carrier frequency of downlink resources (or DL CC) and a carrier frequency of uplink resources (or UL CC) may be designated by a higher layer message such as an RRC message or system information. For example, according to the linkage defined by system information block type 2 (SIB2), a combination of DL resources and UL resources may be determined. More specifically, the linkage may refer to a mapping relationship between a DL CC through which a PDCCH carrying an UL grant is transmitted and an UL CC that uses the UL grant; or a mapping relationship between a DL CC (or an UL CC) through which data for HARQ signal are transmitted and an UL CC (or a DL CC) through which a HARQ ACK/NACK signal is transmitted.

FIG. 8 illustrates an example a distinguishment of cells in a system supporting carrier aggregation, to which a method proposed in the disclosure may be applied.

Referring to FIG. 8, a configured cell is a cell which is configured for carrier aggregation based on a measurement report among cells of an eNB and is configured for each UE as shown in FIG. 5. A configured cell may reserve a resource for ack/nack transmission in advance with respect to PDSCH transmission. An activated cell is a cell configured to actually transmit a PDSCH/PUSCH among the configured cells, which performs Channel State Information (CSI) reporting for PDSCH/PUSCH transmission and Sounding Reference Signal (SRS) transmission. A de-activated cell is a cell configured not to perform PDSCH/PUSCH transmission by a command from the eNB or timer operation, which may stop CSI reporting and SRS transmission.

Hereinafter, an SRS for antenna switching will be described in detail.

SRS for 'AntennaSwitching'

The SRS may be used for acquisition of DL channel state information (CSI) (i.e., DL CSI acquisition). As a specific example, in a single cell or multi cell (e.g., CA) situation based on TDD, a base station (BS) may schedule transmission of the SRS to a user equipment (UE), and then measure the SRS from the UE. In this case, the BS may perform scheduling of a DL signal/channel to the UE based on measurement by the SRS by assuming DL/UL reciprocity. In this case, in relation to DL CSI acquisition based on the SRS, the SRS may be configured for an antenna switching usage.

As an example, according to a specification (e.g., 3gpp TS38.214), the usage of the SRS may be configured to the BS and/or the UE by using a higher layer parameter (e.g., a usage of RRC parameter SRS-ResourceSet). In this case, the usage of the SRS may be configured as a beam management usage, a codebook transmission usage, a non-codebook transmission usage, an antenna switching usage, etc.

Hereinafter, a case where the SRS transmission (i.e., transmission of an SRS resource or an SRS resource set) is configured for the antenna switching usage among the usages will be described in detail.

As an example, in the case of a terminal with a partial reciprocity, SRS transmission based on antenna switching (i.e., transmission antenna switching) may be supported for downlink (DL) channel state information (CSI) acquisition through the SRS transmission in a situation such as time division duplex (TDD). When the antenna switching is applied, approximately 15 μs may be required between SRS resources (and/or the SRS resource and the resource between PUSCH/PUCCH) in a general case for the antenna switching of the UE. By considering such a point, a (minimum) guard period shown in Table 10 below may be defined.

TABLE 3

| μ | $\Delta f=2^{\mu} \cdot 15$ [kHz] | Y [symbol] |
|---|---|---|
| 0 | 15 | 1 |
| 1 | 30 | 1 |
| 2 | 60 | 1 |
| 3 | 120 | 2 |

In Table 3, p represents numerology, represents a subcarrier spacing, and Y represents the number of symbols of the guard period, i.e., a length of the guard period. Referring to Table 3, the guard period may be configured based on a parameter μ for determining the numerology. In the guard period, the UE may be configured not to transmit any other signal, and the guard period may be configured to be intactly used for the antenna switching. As an example, the guard period may be configured by considering SRS resources transmitted in the same slot. In particular, when the UE is configured and/or instructed to transmit an aperiodic SRS configured to intra-slot antenna switching, the corresponding UE may transmit the SRS by using different transmission antennas for each designated SRS resource, and the guard period may be configured between respective resources.

Further, when the UE is configured with the SRS resource and/or the SRS resource set configured for the antenna switching usage through the higher layer signaling, the corresponding UE may be configured to perform the SRS transmission based on the UE capability related to the antenna switching. Here, the capability of the UE related to the antenna switching may be '1T2R', '2T4R', '1T4R', '1T4R/2T4R', '1T1R', '2T2R', '4T4R', etc. Here, 'mTnR' may mean a UE capability supporting m transmissions and n receptions.

(Sample S1) For example, in the case of a UE that supports 1T2R, up to two SRS resource sets may be configured as different values for resourceType of a higher layer parameter SRS-ResourceSet. Here, each SRS resource set may have two SRS resources transmitted in different symbols, and each SRS resource may constitute a single SRS port in a given SRS resource set. Further, an SRS port for a second SRS resource in the SRS resource set may be configured to be associated with a different UE antenna port from an SRS port for a first SRS resource in the same SRS resource set.

(Sample S2) As another example, in the case of a UE that supports 2T4R, up to two SRS resource sets may be configured as different values for resourceType of the higher layer parameter SRS-ResourceSet. Here, each SRS resource set may have two SRS resources transmitted in different symbols, and each SRS resource may constitute a single SRS port in a given SRS resource set. Further, an SRS port pair for the second SRS resource in the SRS resource set may be configured to be associated with a different UE antenna port from the SRS port pair for the first SRS resource in the same SRS resource set.

(Sample S3) As yet another example, in the case of a UE that supports 1T4R, the SRS resource sets may be configured in different schemes according to whether the SRS transmission is configured to be periodic, semi-persistent, and/or aperiodic. First, when the SRS transmission is configured to be periodic or semi-persistent, one SRS resource set constituted by 0 SRS resource set or four SRS resources configured based on for the resourceType of the higher layer parameter SRS-ResourceSet may be configured to be transmitted in different symbols. In this case, each SRS resource may constitute the single SRS port in the given SRS resource set, and the SRS port for each SRS resource may be configured to be associated with different UE antenna ports. Unlike this, when the SRS transmission is configured to be aperiodic, two SRS resource sets constituted by 0 SRS resource set or a total of four SRS resources configured based on for the resourceType of the higher layer parameter SRS-ResourceSet may be configured to be transmitted in different symbols of two different slots. In this case, the SRS ports for respective SRS resources in two given SRS resource sets may be configured to be associated with different UE antenna ports.

(Sample S4) As still yet another example, in the case of the UE that supports 1T1R, 2T2R, or 4T4R, up to two SRS resource sets of which each is constituted by one SRS resource may be configured for the SRS transmission, and the number of SRS ports of each SRS resource may be configured to 1, 2, or 4.

When an indicated UE capability is 1T4R/2T4R, the corresponding UE may expect that SRS ports (e.g., 1 or 2) of the same number will be configured for all SRS resources in the SRS resource set(s). Further, when the indicated UE capability is 1T2R, 2T4R, 1T4R, or 1T4R/2T4R, the corresponding UE may not expect that one or more SRS resource sets configured for the antenna switching usage in the same slot will be configured or triggered. Further, even when the indicated UE capability is 1T1R, 2T2R, or 4T4R, the corresponding UE may not expect that one or more SRS resource sets configured for the antenna switching usage in the same slot will be configured or triggered.

The contents described above may be applied in combination with methods proposed in the present disclosure to be described below or may be supplemented to clarify technical features of the methods proposed in the present disclosure. Methods to be described below are just distinguished for convenience and it is needless to say that some components of any one method may be substituted with some components of another method or may be applied in combination with each other.

Hereinafter, contents related to a trigger type of an SRS, SRS transmission and the transmission of a PUSCH (PUCCH) are specifically described.

A sounding reference signal (SRS) may be transmitted in the last symbol of each subframe in a frequency division duplex (FDD) system.

In a time division duplex (TDD) system, an SRS having one or two symbols may be additionally transmitted based on a special subframe configuration by using an uplink pilot timeslot (UpPTS) in a special subframe in addition to the transmission of an SRS in an uplink subframe.

An SRS having two or four symbols may be transmitted depending on a configuration of an SC-FDMA symbol for an additional uplink use in addition to the existing UpPTS in the special subframe.

The trigger type of the SRS is divided into Type 0 and Type 1 depending on time domain characteristics. In the case of Type 0, the SRS is a periodic SRS based on a higher layer configuration. In the case of Type 1, the SRS is an aperiodic SRS triggered as DCI.

In the LTE standard, a transmission method of a UE for a configured SRS may be different depending on a higher layer parameter, such as accompanied srs-Bandwidth or srs-HoppingBandwidth in an SRS configuration between a base station and a UE. For example, when a value of srs-HoppingBandwidth is greater than a value of srs-Bandwidth, frequency hopping is not configured, repetition is configured, and a UE needs to perform a corresponding operation (repetition) upon SRS transmission. In contrast, when a value of srs-HoppingBandwidth is smaller than a value of srs-Bandwidth, frequency hopping is configured according to an already defined hopping pattern, and a UE needs to perform a corresponding operation (frequency hopping) upon SRS transmission.

In the NR Rel-15 standard, a repetition factor R was added. The repetition factor R is a parameter related to the repetition of an SRS and the frequency hopping. Repetition and hopping are simultaneously configured within a subframe through the repetition factor R, and a UE may perform a corresponding operation (repetition and frequency hopping).

Hereinafter, contents related to the antenna switching of an SRS are described.

In the LTE standard, a 1T4R antenna switching operation may be defined as follows.

If ue-TxAntennaSelection-SRS-1T4R-Config and ue-TransmitAntennaSelection are simultaneously configured with respect to a given serving cell, a UE selects one of the first two antennas for PUSCH transmission, and selects one of four antennas in each SRS instance for SRS transmission.

A 1T2R antenna switching operation may be defined as follows. The presence of a field (ue-TxAntennaSelection-SRS-2T4R-NrOfPairs), as described in TS 36.213, illustrates a configuration of uplink closed-loop transmission antenna selection for a UE for selecting two of four antennas in order to simultaneously transmit an SRS with respect to a corresponding serving cell. Furthermore, the field, as described in TS 36.213, illustrates the number of antenna pairs to be selected for SRS transmission for a given serving cell. 2 (value two) indicates that a UE needs to select one of two antenna pairs in order to simultaneously transmit SRSs in respective SRS instance for a corresponding serving cell. 3 (value three) indicates that a UE selects one of three antenna pairs in order to simultaneously transmit SRSs in respective SRS instances for a corresponding serving cell. An EUTRAN does not simultaneously configure ue-TransmitAntennaSelection and ue-TxAntennaSelection-SRS-2T4R-NrOfPairs with respect to a given serving cell.

In Rel-15 NR MIMO, SRS transmission for antenna switching is supported in order to efficiently acquire DL CSI with respect to a UE having the number of transmission (Tx) chains smaller than the number of reception (Rx) chains.

A UE supporting antenna switching reports one of {"1T2R", "1T4R", "2T4R", "1T4R/2T4R", "T=R"} to a base station as its capability. The base station may configure an SRS resource set and resources for antenna switching corresponding to the corresponding capability, and may indicate transmission. Furthermore, the base station may place and configure a symbol gap according to numerology as a guard period between resources when configuring a time domain location of a resource within the SRS resource set for antenna switching uses by considering an antenna switching time of a UE (description related to Table 3).

Hereinafter, an agreement related to LTE MIMO enhancement (additional SRS) that may be applied to the method proposed in the disclosure is described.

1. Agreement (Scenarios Considered for Additional SRS)

The work for additional SRS symbols in this WI should consider the following scenarios TDD for non-CA TDD only CA

FDD-TDD CA

2. Agreement (Position in Time Domain of Additional SRS Symbol)

Positions in the time domain of additional SRS symbols possible in one general UL subframe for a cell include:

Option 1: Use all symbols in one slot for SRS from a cell perspective

For example, another slot of the subframe may be used for PUSCH transmission for an sTTI capable UE.

Option 2: Use all symbols in one subframe for SRS from a cell perspective

Option 3: A subset of symbols in one slot may be used for SRS from a cell perspective However, the position of the additional SRS is not limited to the above-described options.

For an area with a low downlink SINR, support of an additional SRS symbol per UE in a normal subframe may bring a gain in downlink performance.

3. Agreement (Aperiodic SRS Support)

Aperiodic SRS transmission may be supported for additional SRS symbols.

4. Agreement (Transmission of Additional SRS)

A UE configured with an additional SRS in one UL subframe may transmit the SRS based on any one of the following options.

Option 1: Frequency hopping is supported within one UL subframe.

Option 2: Repetition within one UL subframe is supported.

Option 3: Both frequency hopping and repetition are supported within one UL subframe.

5. Agreement

Both intra-subframe frequency hopping and repetition are supported for aperiodic SRS in additional symbols).

6. Agreement (Additional SRS and Antenna Switching)

Antenna switching within a subframe is supported for aperiodic SRS in an additional SRS symbol.

The term additional SRS symbol is additionally introduced in Rel-16 and the last symbol is not part of the additional SRS symbol.

7. Agreement (Transfer of Legacy SRS and Additional SRS)

Both legacy SRS and additional SRS symbol(s) may be configured for the same UE.

If the legacy SRS is aperiodic, the UE may transmit the legacy SRS or additional SRS symbol(s) in the same subframe.

If the legacy SRS is periodic, the UE may transmit the legacy SRS and additional SRS symbol(s) in the same or different subframes.

8. Agreement (Number of Symbols in Additional SRS)

The number of symbols that may be configured in the UE as an additional SRS is 1-13.

In the future, the following contents may be considered in relation to agreements.

For intra-subframe frequency hopping and repetition of additional SRS symbols)

In the support of repetition and frequency hopping, the following contents may be discussed.

A value $n_{SRS} = \lfloor l/R \rfloor$. In this case, $l \in \{0, 1, \ldots, N_{symb}^{SRS} - 1\}$ is an OFDM symbol number.

A value of $N_{symb}^{SRS}$. In this case, $N_{symb}^{SRS}$ is the number of configured SRS symbols, and R is a repetition factor for a configured UE.

An application to an aperiodic SRS

Whether legacy SRS and additional SRS symbols have the same hopping pattern

Whether flexible configuration (e.g., comb/comb offset configuration) is supported for repetition of additional SRS symbols).

9. Agreement

For the temporal position of possible additional SRS (SRS) symbols in one general UL subframe for a cell:

use 1 to 13 symbols in one subframe for SRS from a cell point of view

10. Agreement (Power Control)

Same power control configuration applies for all additional SRS symbols configured to a single UE.

11. Agreement

Transmission of aperiodic legacy SRS and aperiodic additional SRS symbol(s) in the same subframes for a UE is supported.

12. Agreement

In the case of aperiodic SRS transmission, a combination of the following characteristics may be simultaneously configured.

Intra-subframe antenna switching

Antenna switching is supported through at least all antenna ports.

Whether to support next contents may be additionally considered.

Antenna switching across a subset of antenna ports

Frequency hopping within a subframe

Intra-subframe repetition

Whether the aforementioned characteristics are applied to only an additional SRS symbol or also applied to a legacy SRS symbol may be considered.

13. Agreement

In supporting the repetition $n_{SRS}=\lfloor l/R \rfloor$ of an SRS, the following parameter may be defined. In this case $l \in \{0, 1, \ldots, N_{symb}^{SRS}-1\}$ is an OFDM symbol number, $N_{symb}^{SRS}$ is the number of configured SRS symbols, and R is a repetition factor for a configured UE.

14. Agreement

A configurable number of additional SRS repetitions may be {1, 2, 3, 4, 6, 7, 8, 9, 12, 13}. The corresponding configuration may be applied per antenna port and per subband.

15. Agreement (Trigger of SRS Transmission Through a Codepoint of DCI)

A codepoint of the same DCI triggers SRS transmission for one of the followings.

Only aperiodic legacy SRS symbols

Only aperiodic additional SRS symbols

Both aperiodic legacy and aperiodic additional SRS symbols within the same subframe The association of the codepoint and one of the above may be configured by RRC signaling. If SRS triggering is not present, a separate codepoint may be supported.

16. Agreement

The size of an SRS request field for triggering an Rel-16 SRS may be the same as the existing (Rel-15 DCI format).

17. Agreement

Only Rel-15 DCI formats that support SRS triggering can be used to trigger Rel-16 SRS transmission.

18. Agreement

In the case of an additional SRS symbol, per-symbol group hopping and sequence hopping may be supported.

In a given time, only one of per-symbol group hopping or sequence hopping can be used by a UE.

19. Agreement

In order to solve at least power change attributable to frequency hopping or antenna switching for an additional SRS symbol, one of the following options may be considered.

Option 1: A guard period of one symbol may be introduced into RAN1 spec.

Option 2: A guard period may not be introduced into RAN1 spec.

In the UL normal subframe of the LTE TDD system up to Rel-15, both a cell-specific SRS for a specific cell and a UE-specific SRS for a specific UE may be configured only in one symbol (last symbol) in one subframe.

As described above, in the Rel-16 LTE MIMO enhancement, only the aperiodic SRS in the additional SRS of the UL normal subframe is preferentially supported.

Additional SRS (additional SRS) is different from the purpose of legacy SRS.

Legacy SRS is utilized for several purposes. Specifically, the purposes of the legacy SRS include:

obtaining UL CSI for UL scheduling or obtaining UL link adaptation or DL CSI for DL scheduling utilizing DL/UL reciprocity On the other hand, unlike legacy SRS, additional SRS may be seen as an SRS mainly targeting obtaining DL information of each cell using DL/UL reciprocity in a single serving cell or multi-cell (CA environment).

Unlike legacy SRS, which is transmitted only in the last symbol of the conventional UL normal subframe, the additional SRS may be transmitted through multiple symbols in a symbol position other than the last symbol.

Currently, in one UL subframe, a multi-symbol SRS may be configured from 1 symbol to 13 symbols except a legacy SRS (except the last symbol) from a cell viewpoint or from a UE viewpoint.

As described above, in a flexibly configurable multi-symbol SRS, in order to enhance a capacity and coverage, repetition and frequency hopping need to be accompanied.

Furthermore, in a UE implementation method in which the number of Tx chains is smaller than the number of Rx chains, an SRS antenna switching operation used for DL CSI acquisition based on DL/UL reciprocity also acts as an important function in a multi-symbol SRS.

In relation to the SRS transmission of a UE, two or more operations (frequency hopping/repetition/antenna switching) may be simultaneously supported in one subframe. However, if frequency hopping/repetition and antenna switching are simultaneously configured by a base station in a multi-symbol SRS, ambiguity may occur in a UE operation if a symbol number configuration of an SRS in which a configured frequency hopping/repetition and antenna switching operation may be finished within a subframe and a base station configuration in which a guard period (e.g., a gap symbol in NR Rel-15) which may be defined between SRS symbols are not present. For example, how a gap symbol will be configured and a UE operation when antenna switching and frequency hopping/repetition are simultaneously configured needs to be specifically determined.

In the existing LTE, $n_{SRS}$, that is, a parameter that counts the transmission number of an SRS, is increased across a subframe based on the periodicity of a UE-specific SRS. As the repetition factor R supported in NR is supported, $n_{SRS}$ is increased by an SRS symbol number and an R value even within a subframe like $n_{SRS}=\lfloor l/R \rfloor$ (wherein $l \in \{0, 1, \ldots, N_{symb}^{SRS}-1\}$).

Hereinafter, an antenna switching-related operation is more specifically described.

If closed-loop or open-loop UE Tx antenna selection has been activated with respect to a given serving cell with respect to a UE supporting Tx antenna selection or a UE in which SRS-Antenna-Switching-1T4R or SRS-Antenna-Switching-2T4R may be configured, If a higher layer parameter 'SRS-Antenna-Switching-1T4R' is set as 'on' with respect to a given serving cell, an index $a(n_{SRS})$ of a UE antenna in which an SRS is transmitted in $n_{SRS}$ is given as follows.

$$a(n_{SRS}) = n_{SRS} \bmod 4$$

In the above equation, $a(n_{SRS})$ is a partial and entire sounding bandwidth and is based on a case where frequency hopping has been deactivated (i.e., $b_{hop} \geq B_{SRS}$).

$$a(n_{SRS}) = \begin{cases} \left(\left(n_{SRS} + \left\lfloor \frac{n_{SRS}}{\max(4,K)} \right\rfloor\right) + \beta\left(\left\lfloor \frac{n_{SRS}}{4} \right\rfloor \bmod \left\lceil \frac{\max(4,K)}{4} \right\rceil\right)\right) \bmod 4, & \text{when } K \text{ is even} \\ n_{SRS} \bmod 4, & \text{otherwise} \end{cases}$$

In the above equation, β is 1 when K mod $\wedge^2$=0 and 0 if not 0, and is based on a case where frequency hopping has been activated (i.e., $b_{hop} < B_{SRS}$).

With respect to a UE composed of $\wedge$UE antenna pairs, if a higher layer parameter 'SRS-Antenna-Switching-2T4R' is set to 'on' with respect to a given serving cell, in this case, $\wedge$={2 or 3} is provided by a higher layer parameter 'SRS-Antenna-Switching-2T4R-NrofPairs'.

With respect to a UE antenna pair such as {$2a(n_{SRS})$, $2a(n_{SRS})+1$} when $\wedge$=2 and {0, $a(n_{SRS})+1$} when $\wedge$=3, an index $a(n_{SRS})$ in which an SRS is transmitted in a number $n_{SRS}$ is given as follows.

$$a(n_{SRS}) = n_{SRS} \bmod \wedge$$

In the above equation, $a(n_{SRS})$ is for a partial and entire sounding bandwidth and is based on a case where frequency hopping has been deactivated (i.e., $b_{hop} \geq B_{SRS}$).

$$a(n_{SRS}) = \begin{cases} \left(\left(n_{SRS} + \left\lfloor \frac{n_{SRS}}{\wedge} \right\rfloor\right) + \beta\left(\left\lfloor \frac{n_{SRS}}{K} \right\rfloor\right)\right) \bmod \wedge, & \text{when } K \bmod \wedge = 0 \\ n_{SRS} \bmod \wedge, & \text{otherwise} \end{cases}$$

In the above equation, β is 1 when K mod $\wedge^2$=0 and is 0 if not, and is based on a case frequency hopping has been activated (i.e., $b_{hop} < B_{SRS}$).

If not, an index $a(n_{SRS})$ of a UE antenna in which an SRS is transmitted in the number $n_{SRS}$ is given as follows.

$$a(n_{SRS}) = n_{SRS} \bmod 2$$

In the above equation, $a(n_{SRS})$ is for a partial and entire sounding bandwidth, and is based on a case where frequency hopping has been deactivated (i.e., $b_{hop} \geq B_{SRS}$).

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases}$$

In the above equation, β is 1 when K mod 4=0, and is 0 if not 0, and is based on a case where frequency hopping has been activated (i.e., $b_{hop} < B_{SRS}$) · A $$K = \prod_{b'=b_{hop}}^{B_{SRS}} N_{b'}.$$

BSRS, bhop, Nb, and nSRS may be provided by Tables 4 to 7 below. In this case, $N_{b_{hop}}=1$ regardless of a value of $N_b$. A case where single SRS transmission is configured in a UE is excluded. One or more serving cells are configured in a UE. With respect to a cell group belonging to a band signaled to be together switched in txAntennaSwitchUL, the UE does not except that it will simultaneously transmit SRSs on different antenna port. One or more serving cells are configured in a UE. With respect to a cell group belonging to a band signaled to be together switched in txAntennaSwitchUL, the UE does not expect that it will simultaneously transmit an SRS and a PUSCH through different antenna ports.

If a higher layer parameter 'SRS-Antenna-Switching-1T4R' is set to 'on' with respect to a serving cell or 'SRS-Antenna-Switching-2T4R' is set to 'on', a UE does not expect that an antenna port larger than two antenna ports will be configured for a given uplink physical channel or signal of a corresponding serving cell.

Tables 4 to 7 illustrate values of $m_{SRS,b}$ and $N_b$ when b=0, 1, 2, 3 with respect to an uplink bandwidth.

The uplink bandwidth is $6 \leq N_{RB}^{UL} \leq 40$ in the case of Table 4, $40 < N_{RB}^{UL} \leq 60$ in the case of Table 5, $60 < N_{RB}^{UL} \leq 80$ in the case of Table 6, and $80 < N_{RB}^{UL} \leq 110$ in the case of Table 7.

TABLE 4

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 5

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $B_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |

TABLE 5-continued

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $B_{SRS,2}$ | $N_2$ | $m_{SRS,3}$ | $N_3$ |
| 6 | 20 | 1 | 4 | 5 | 4 | 1 | 4 | 1 |
| 7 | 16 | 1 | 4 | 4 | 4 | 1 | 4 | 1 |

TABLE 6

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 7

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

According to the antenna switching operation, when $n_{SRS}$ is increased, an antenna port is also switched. In this case, if a UE operates based on the repetition factor-related agreements, when performing frequency hopping after a repetition during R symbols, antenna port switching also occurs, and the UE does not transmit an SRS with respect to the same hopping band and transmits an SRS with respect to different hopping bands for each antenna port.

By considering such a problem, the present disclosure proposes a symbol number configuration/indication method and antenna switching within a subframe) for a multi-symbol SRS between a base station and a UE and a configuration and indication method considering frequency hopping/repetition (within a subframe/between subframes), and describes a UE operation based on a corresponding configuration.

A UE that applies at least one of the proposals in the present disclosure is called an "enhanced UE" for convenience sake. For example, a case where a multi-symbol SRS or an additional (or a plurality of SRS transmissions within a single subframe), such as Rel-16 UE, is configured/applies/transmitted is included.

In the present disclosure, an additional SRS in the LTE system is basically described for convenience sake, but this may be applied to all systems which transmit an SRS in a plurality of symbols such as 3GPP NR (New RAT, New Radio Access Technology). Furthermore, if the present disclosure is applied in NR, a subframe and slot a structure/unit in the LTE system may be modified and applied as in Table 8 below in the NR system.

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

[Method 1]

Hereinafter, a UE/base station operation related to antenna switching and frequency hopping/repetition of an SRS is described.

Specifically, a symbol number configuration/indication method (within a subframe) for a multi-symbol SRS (or additional SRS) between a base station and a UE, a configuration and indication method considering antenna switching and frequency hopping/repetition (within a subframe/between subframes), and a subsequent UE operation are described.

In an additional SRS configuration, a base station/UE may operate based on at least one of the following proposals. The following methods are merely divided for convenience of description, and some elements of any one method may be substituted with some elements of another method or may be mutually combined and applied.

[Proposal 1]

A UE may report, to a base station, whether a gap symbol is necessary in the frequency hopping and/or antenna switching operation. In the present disclosure, the gap symbol means a symbol in which an SRS is not transmitted, and may also be denoted a guard period or a guard symbol.

Alternatively, when a UE reports whether a gap symbol is necessary to a base station with a UE capability, the UE may determine whether the base station configures the guard period. Specifically, the base station may determine whether a guard period (e.g., a gap symbol) will be configured between SRS symbols on which frequency hopping and/or antenna switching is performed upon additional SRS configuration by considering the capability of the UE.

For example, if frequency hopping is performed, in the case of a UE having a better capability or a UE equipped with an RF having a good capability, a power transient period is short or the deterioration of a transmission symbol attributable to an already power transient period may be small. Accordingly, a gap symbol may not be necessary between SRS symbols on which frequency hopping is performed.

Furthermore, even in the case of antenna switching, a gap symbol may not be necessary between SRS symbols upon antenna switching (at the moment when an antenna port is switched) for the same reason. In this case, a UE may report, to a base station, that a gap symbol is not necessary in a frequency hopping and/or antenna switching operation. The corresponding base station may configure an SRS symbol (within a subframe) without a gap symbol. This can reduce resource waste attributable to the indiscrete configuration of n gap symbol.

In contrast, if a UE has reported that a gap symbol is necessary in a frequency hopping and/or antenna switching operation, a base station may configure SRS symbols (within a subframe) by placing a gap symbol between SRS symbols in which the frequency hopping and/or antenna switching operation is performed. As described above, the capability deterioration of an SRS symbol attributable to a power transient period can be prevented through the gap symbol configuration.

With respect to a frequency hopping operation and an antenna switching operation, the aforementioned UE capability reporting may be reported for each operation or may be integrated into one and reported.

[Proposal 2]

A base station may configure symbols (through a higher layer) in which an additional SRS including a gap symbol in one subframe may be configured in a UE. In this case, the symbols may be a location candidate group of gaps (gap symbols) and additional SRSs.

For example, a base station may configure, in a UE, a starting symbol index and the number of symbols (i.e., a spanned symbol number) from the starting symbol index by considering a symbol index (index 13, that is, except the last symbol) in a 0~12 symbol range in which an additional SRS may be configured in one subframe. The UE transmits an SRS within the corresponding range, and does not expect an additional SRS configuration out of the corresponding range. Alternatively, the UE may disregard and drop an additional SRS configuration and an SRS symbol out of the corresponding range.

There are effects in that an SRS capacity can be guaranteed from a multi-UE viewpoint and SRS-transmittable ranges are not invaded between UEs through the corresponding operation. Furthermore, a symbol index for an additional SRS and gap symbol within a symbol range configured in the UE can be re-indexed.

[Proposal 3]

(When a UE requires a gap symbol upon frequency hopping and/or antenna switching), a base station may configure, in the UE, a location of a gap symbol within a subframe) in a symbol level through higher layer signaling as part of an additional SRS configuration. A configuration method may be based on at least one of the following options.

Option 1)

A base station may configure a gap symbol location in a UE in a bitmap form. For example, the location of the gap symbol may be expressed as 13 bits by considering a symbol index (index 13, that is, except the last symbol) in a 0-12 range in which an additional SRS may be configured in one subframe. For example, if a bitmap is 0010010010000, the gap symbol is configured in third, sixth and ninth symbols (symbol indices 2, 5, and 8).

Option 2)

A base station may configure a gap symbol location in a UE in an equation form.

Example 1) if only frequency hopping/repetition is configured in a UE and the UE requires a gap symbol between SRS symbols on which frequency hopping is performed, the gap symbol may be configured as follows.

If n+1 among symbol indices n (e.g., n is 0~12) where a guard symbol may be location can be divided by a value obtained by adding 1 to a repetition factor R (e.g., (n+1) mod (R+1)=0), a base station may configure the corresponding symbol n in the UE as a guard symbol.

Example 2) If only antenna switching is configured in a UE and the UE requires a gap symbol between SRS symbols in which an antenna port is switched, the gap symbol may be configured as follows. If n+1 can be divided by 2 (e.g., (n+1) mod 2=0), a base station may configure the corresponding symbol n in the UE as a guard symbol.

Example 3) If frequency hopping/repetition and antenna switching are simultaneously configured in a UE and the UE requires gap symbols for both the operations, the gap symbol may be configured as follows. As in the aforementioned example, if n+1 can be divided by a value obtained by adding 1 to a repetition factor R (e.g., (n+1) mod (R+1)=0), a base station may configure the corresponding symbol n as a guard symbol.

Furthermore, if frequency hopping/repetition and antenna switching are simultaneously configured in a UE, but a gap symbol is necessary for only the antenna switching operation, the gap symbol may be configured as follows. If n+1 can be divided by a value obtained by adding 1 to a value obtained by multiplying a repetition factor R by a number taken to perform frequency hopping on a configured SRS bandwidth upon SRS hopping transmission, a base station may configure the corresponding symbol n as a guard symbol. In this case, a condition related to the present embodiment may be expressed as the following equation.

$$(n+1) \bmod (R \times \Pi_{b'=b_{hop}+1}^{b} N_b + 1) = 0$$

In this case, Nb may be a value based on Tables 4 to 7. Equation $\Pi_{b'=b_{hop}+1}^{b} N_{b'}$ is a number of hops taken to fully cover an SRS bandwidth configured by changing a frequency band by a hopping bandwidth (e.g., $b_{hop} < B_{SRS}$) when frequency hopping is configured. The corresponding number of hops may be different depending on the value $b_{hop}$.

Through a corresponding operation that associates an Nb parameter, a gap symbol attributable to antenna switching can be minimized and the waste of resources can be reduced because a frequency hopping/repetition operation is completed prior to antenna switching.

The proposal operation is not simply limited to an operation based on the above equation, and may also include a case where the above equation has been expanded.

Hereinafter, contents related to the frequency hopping of an SRS are specifically described.

Frequency hopping of an SRS is configured by a parameter $b_{hop} \in \{0, 1, 2, 3\}$ provided by a higher layer parameter srs-HoppingBandwidth. Frequency hopping may not be supported for aperiodic transmission.

If frequency hopping of an SRS has not been activated (i.e., $b_{hop} \geq B_{SRS}$), a frequency location index $n_b$ is constantly maintained (is not reconfigured) and defined by $n_b = \lfloor 4n_{RRC}/m_{SRS,b} \rfloor \bmod N_b$. In this case, $n_{RRC}$ is given by higher layer parameters freqDomainPosition and freqDomainPosition-ap with respect to each configuration of periodic and aperiodic transmissions.

If frequency hopping of an SRS has been enabled (i.e., $b_{hop} < B_{SRS}$), a frequency location index $n_b$ may be defined as follows.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

In this case, regardless of the value $N_b$ in Tables 4 to 7, $N_{b_{hop}}=1$. $n_{srs}$ may be based on the following equation.

$$n_{SRS} = \begin{cases} 2N_{SP}n_f + 2(N_{SP}-1)\lfloor \frac{n_s}{10} \rfloor + \lfloor \frac{T_{offset}}{T_{offset\_max}} \rfloor & \text{for 2 ms SRS periodicity of frame structure type 2} \\ \lfloor (n_f \times 10 + \lfloor n_s/2 \rfloor)/T_{SRS} \rfloor, & \text{otherwise} \end{cases}$$

$n_{srs}$ counts the number of UE-specific SRS transmissions. In this case, $T_{SRS}$ is UE-specific periodicity of SRS transmission defined in Paragraph 8.2 of 3GPP TS 36.213, and $T_{offset}$ is an SRS subframe offset defined in Table 8.2-2 of 3GPP TS 36.213. $T_{offset\_max}$ is a maximum $T_{offset}$ value of a specific configuration of an SRS subframe offset.

In this case, in Option 2, a symbol index where a guard symbol may be located may be re-indexed in a range in which an additional SRS may be configured (an SRS symbol can be spanned) in one subframe with respect to a corresponding UE as in Proposal 2.

[Proposal 4]

(When a UE requires a gap symbol upon frequency hopping and/or antenna switching) a base station may configure, in the UE, an SRS symbol number and location which will be actually transmitted except a gap symbol (within a subframe) through higher layer signaling as part of an additional SRS configuration. A configuration method may be based on at least one of the following options.

In a UE, an SRS symbol index and a symbol number may be counted except a corresponding gap symbol when a gap symbol described in Proposal 3 is present. For example, as in Option 1 of Proposal 3, when three gap symbols are configured, if eight SRS symbols have been configured, eight SRS symbols mean the number of symbols in which an SRS is actually transmitted except the three gap symbols. Furthermore, an SRS symbol index may also be re-indexed with respect to symbols in which the SRS is actually transmitted.

Option 1)

A base station may configure an SRS symbol number and may configure an SRS symbol location in a bitmap form. For example, the location of an SRS symbol may be expressed as 13 bits by considering a symbol index (index 13, that is, except the last symbol) in a 0-12 range in which an additional SRS may be configured in one subframe. For example, if a bitmap is 1101101101100, an SRS is configured in 1, 2, 4, 5, 7, 8, 10, 11-th symbols (symbol indices 0, 1, 3, 4, 6, 7, 9, and 10) (a total of eight SRS symbols). In this case, an SRS symbol index actually transmitted by a UE may be indexed again from 0 to 7 with respect to the eight SRS symbols.

Option 2)

A base station may configure an SRS symbol number and may configure an SRS symbol location in an equation form. For example, in Option 2 of Proposal 3, symbols (i.e., symbols corresponding to a complementary set for a set including gap symbols based on Option 2 of Proposal 3 in a subframe in which an SRS is configured except gap symbols satisfying the condition in Examples 1), 2), and 3) may be configured as SRS symbol locations. For example, an SRS symbol may be configured in a symbol index n that does not satisfy (n+1) mod (R+1)=0 in Example 1).

In this case, furthermore, a symbol index where an SRS symbol may be located in Option 2 may be re-indexed in a range (an SRS symbol may be spanned) in which an additional SRS may be configured in one subframe in a corresponding UE as in Proposal 2.

[Proposal 5]

Hereinafter, if a frequency hopping/repetition operation and/or an antenna switching operation has been configured, an SRS transmission number ($n_{SRS}$) counting method and an antenna switching method are described. In this case, the symbol number of an additional SRS means the number of symbols in which an SRS is actually transmitted except a gap symbol. Furthermore, a symbol index may also be re-indexed with respect to symbols in which an SRS is actually transmitted.

For example, if only UE frequency hopping/repetition has been configured, the transmission number of an SRS may be counted (the value $n_{SRS}$ is increased) based on $n_{SRS}=\lfloor I'/R \rfloor$. In this case, I' means a re-indexed SRS symbol index. When $n_{SRS}$ is increased, frequency hopping may be performed.

If only UE antenna switching has been configured, the transmission number of an SRS may be counted based on $n_{SRS}=I'$. In this case, I' means a re-indexed SRS symbol index. Through a corresponding operation, for example, upon 1T4R antenna switching operation, whenever $n_{SRS}$ is increased as in $a(n_{SRS})=n_{SRS}$ mod 4, a conventional antenna switching operation may be supported in a form in which an antenna port is changed. In this case, the index $a(n_{SRS})$ illustrates a UE antenna port in which an SRS is transmitted in the number $n_{SRS}$.

Specifically, for example, antenna port switching occurs as nSRS is increased based on Rel-15 LTE specifications including an operation related to "a(nSRS)=nSRS mod 4" for 1T4R. In current LTE specifications, the granularity of nSRS is a subframe level. In this case, in order to update nSRS for symbol level granularity, the counter nSRS needs to be updated as follows.

If only antenna switching has been configured in a UE, nSRS may be increased by an OFDM symbol number I (e.g., nSRS=I'). In this case, I' is a counting variable that is renumbered with respect to actual SRS transmission.

If frequency hopping/repetition and antenna switching have been simultaneously configured in a UE, the transmission number of an SRS may be counted ($n_{SRS}$ value is increased) based on $n_{SRS}=\lfloor I'/R \rfloor$. In this case, I' means a re-indexed SRS symbol index.

In the existing antenna switching operation, for example, upon 1T4R antenna switching operation, a factor $n_{SRS}$ included in a function called $a(n_{SRS})$ like $a(n_{SRS})=n_{SRS}$ mod 4 may be inputted/configured in a form that takes a lower bound of $n_{SRS}/\Pi_{b'=b_{hop}+1}^{b} N_{b'}$ unlike in the existing method (e.g., $a(n_{SRS})=\lfloor n_{SRS}/\Pi_{b'=b_{hop}+1}^{b} N_{b'} \rfloor \mod 4$)). Equation $\Pi_{b'=b_{hop}+1}^{b} N_{b'}$ may correspond to a number of hops (the corresponding number of hops may be different depending on the value $b_{hop}$) taken to fully cover an SRS bandwidth configured by changing a frequency band by a hopping bandwidth (e.g., $b_{hop} < B_{SRS}$) when frequency hopping is configured. Through the corresponding equation, an antenna port can be identically maintained as many as the number of hops taken to fully cover an SRS bandwidth configured through frequency hopping.

Through a corresponding operation that associates the Nb parameter, a gap symbol attributable to antenna switching can be minimized and the waste of resources can be reduced because a frequency hopping/repetition operation prior to antenna switching.

However, if antenna switching and frequency repetition/hopping have been simultaneously configured, the aforementioned operation of "a(nSRS)=nSRS mod 4" may be modified to properly accommodate a frequency hopping/repetition operation based on the assumption that the following antenna switching to which frequency hopping/repetition is first applied is applied. Accordingly, the above operation may be modified so that a UE antenna (e.g., a(nSRS)) in which an SRS is transmitted in nSRS is changed after all hopping bands are sounded if antenna switching and frequency hopping/repetition have been simultaneously configured in a UE (e.g., $a(n_{SRS}) = \lfloor n_{SRS} / \Pi_{b_{hop}+1}^{b} N_b \rfloor$ mod 4 for 1T4R, Nb is a value based on Tables 4 to 7).

The proposal operation is not limited to an operation simply based on the above equation, and may also include a case where the above equation has been expanded.

According to an embodiment, a signaling procedure between a UE and a base station based on Method 1 may be performed as follows.

Step 0) An SRS configuration is received based on at least one of Proposal 1-5 (UE capability reporting may be performed as in Proposal 1 before that)

Step 0-1) A configuration for transmitting an SRS in one or more symbols is received.

Step 0-1-1) information which may be included in a configuration (36.331 SoundingRS-UL-Config)

Step 0-2) An SRS configuration may include SRS-related information which is periodically and/or aperiodically transmitted.

Step 2) If an SRS trigger is received (through PDCCH) through a DL/UL grant or if RRC configuration-based SRS transmission timing is reached Step 1-1) SRS transmission with respect to a resource capable of SRS transmission based on Proposals 2-5

All the steps are not essential, and some steps may be omitted or added depending on a situation of a UE.

In an implementation aspect, operations of a base station/UE according to the aforementioned embodiments (e.g., the operations related to the transmission of an SRS based on at least one of Proposal 1/Proposal 2/Proposal 3/Proposal 4/Proposal 5) may be processed by an apparatus (e.g., the processor 102, 202 in FIG. 13) in FIGS. 12 to 16 to be described later.

Furthermore, operations of a base station/UE (e.g., the operations related to the transmission of an SRS based on at least one of Proposal 1/Proposal 2/Proposal 3/Proposal 4/Proposal 5) according to the aforementioned embodiment may be stored in a memory (e.g., 104, 204 in FIG. 13) in the form of an instruction/program (e.g., instruction, executable code) for driving at least one processor (e.g., 102, 202 in FIG. 13).

FIG. 9 is a flowchart for describing an operation of a UE to which a method proposed in the present disclosure may be applied. FIG. 9 is only for convenience of description, and does not limit the scope of the present disclosure.

Referring to FIG. 9, a case where a UE performs uplink transmission (e.g., an UL channel, an additional SRS) based on the method described in Method 1 (e.g., Proposal 1/Proposal 2/Proposal 3/Proposal 4/Proposal 5) is assumed.

The UE may receive an SRS configuration from a base station, etc. (S910). For example, as in Method 1 (e.g., Step 0 in Proposal 1/Proposal 2/Proposal 3/Proposal 4/Proposal 5)), the UE may receive an SRS configuration including information related to SRS (e.g., an additional SRS, an UpPts SRS). For example, the SRS configuration may be received through RRC signaling.

The UE may receive DCI related to the transmission of an SRS and/or an UL channel (S920). Alternatively, the information related to the transmission of an SRS and/or an UL channel may be substituted with a RRC configuration. For example, the DCI may include information that triggers an SRS. For example, the RRC configuration may be an SRS configuration described in S910. For example, the RRC configuration may include information (e.g., period/offset) related to SRS transmission timing.

Thereafter, the UE may transmit an SRS and/or an UL channel(s) based on the received SRS configuration, DCI and/or a predefined rule (e.g., a gap symbol location, an SRS symbol location, or SRS symbol indexing) (S930). For example, in multi symbol SRS transmission, the UE may transmit an SRS and/or an UL channel(s) with respect to a resource described and configured in Method 1 (e.g., Proposal 1/Proposal 2/Proposal 3/Proposal 4/Proposal 5).

In FIG. 9, it is evident that the reception operation of the UE may be understood as a transmission operation of a base station and the transmission operation of the UE may be understood as a reception operation of a base station.

As described above, Method 1 (e.g., Proposal 1/Proposal 2/Proposal 3/Proposal 4/Proposal 5/FIG. 9) may be implemented by the apparatus (e.g., FIGS. 12 to 16) to be described hereinafter. For example, a UE may correspond to a first wireless device, a base station may correspond to a second wireless device, and may also be considered in the opposite case depending on a case.

For example, Method 1 (e.g., Proposal 1/Proposal 2/Proposal 3/Proposal 4/Proposal 5/FIG. 9) may be processed by the one or more processors (e.g., 102/202) in FIGS. 12 to 16. Method 1 (e.g., Proposal 1/Proposal 2/Proposal 3/Proposal 4/Proposal 5/FIG. 9) may be stored in the memory (e.g., the one or more memories (e.g., 104/204) of FIG. 13) in the form of an instruction/program (e.g., instruction, executable code) for driving at least one processor (e.g., 102/202) in FIGS. 12 to 16.

Hereinafter, the aforementioned embodiments are specifically described with reference to FIG. 10 in terms of an operation of a UE. The following described methods are divided only for convenience of description, and some elements of any one method may be substituted with some elements of another method and may be mutually combined and applied.

FIG. 10 is a flowchart for describing a method of transmitting, by a UE, a sounding reference signal in a wireless communication system according to an embodiment of the present disclosure.

Referring to FIG. 10, the method of transmitting, by the UE, a sounding reference signal (SRS) in a wireless communication system according to an embodiment of the present disclosure may include an SRS configuration information reception step S1010 and an SRS transmission step S1020.

In S1010, the UE receives configuration information related to the transmission of the sounding reference signal (SRS) from a base station.

According to an embodiment, the SRS may be configured in a region comprised of at least one symbol other than the last symbol of a subframe. The SRS may be based on an additional SRS.

The region may include a specific number of guard symbols. The guard symbol may be related to at least one of frequency hopping or antenna switching of the SRS. The present embodiment may be based on Proposal 1 or Proposal 2.

According to an embodiment, the specific number may be determined based on at least one of the frequency hopping or the antenna switching. For example, the guard symbol may be configured between symbols in which the frequency hopping is performed or between symbols in which the antenna switching is performed.

According to an embodiment, the transmission number of the SRS may be determined based on a factor related to the repetition of the SRS and a specific symbol index.

The present embodiment may be based on Proposal 5. Specifically, the transmission number of the SRS may be $n_{SRS}$ in Proposal 5, the factor may be a repetition factor R, and the specific symbol index may be l'.

The specific symbol index may be related to symbols except the specific number of guard symbols among symbols within the region. Specifically, the specific symbol index may be based on an SRS symbol index re-indexed based on symbols in which the SRS is transmitted in the region in which the SRS is configured.

The frequency hopping or the antenna switching may be performed based on the transmission number. For example, the frequency hopping may be performed based on the transmission number being increased.

The frequency hopping may be performed earlier than the antenna switching. The antenna switching may be performed based on at least one of the transmission number or the number of the frequency hopping performed on a bandwidth in which the transmission of the SRS is configured.

Specifically, an antenna port in which the SRS is transmitted is changed by the antenna switching. An index $a(n_{SRS})$ of the antenna port in which the SRS is transmitted may be changed based on the transmission number $n_{SRS}$ and a number of hops (i.e., a frequency hopping number) taken to full cover an SRS bandwidth configured by changing a frequency band by a hopping bandwidth. That is, $a(n_{SRS})$ may be determined based on a value obtained by dividing the transmission number by the number of the frequency hopping performed on a bandwidth in which the transmission of the SRS is configured. Accordingly, the antenna port can be identically maintained by the number of hops taken to fully cover the configured SRS bandwidth.

According to an embodiment, the configuration information may include information related to the region. The information related to the region may include information on at least one of the number of symbols or a location of a symbol. The present embodiment may be based on at least one of Proposal 2, Proposal 3 or Proposal 4.

The number of symbols or the location of the symbol may be related to at least one of a symbol in which the SRS is transmitted or a guard symbol.

For example, the location of the symbol may be based on a starting symbol index. The number of symbols may be based on the number of symbols across the region. In this case, the number of symbols may include the number of guard symbols and the number of symbols in which the SRS is transmitted. That is, the number of symbols may be based on the sum of the number of guard symbols and the number of symbols in which the SRS is transmitted.

According to S1010, the operation of receiving, by the UE (100/200 in FIGS. 12 to 16), configuration information related to the transmission of a sounding reference signal (SRS) from the base station (100/200 in FIGS. 12 to 16) may be implemented by the apparatus of FIGS. 12 to 16. For example, referring to FIG. 13, the one or more processors 102 may control the one or more transceivers 106 and/or the one or more memories 104 to receive configuration information related to the transmission of a sounding reference signal (SRS) from the base station 200.

The method may further include a UE capability information transmission step prior to S1010. In the UE capability information transmission step, the UE may transmit, to the base station, UE capability information related to whether to configure a guard symbol. The UE capability information may be based on Proposal 1. The UE capability information may indicate whether a guard symbol configuration is necessary. Whether to configure the guard symbol may be determined based on UE capability information. The guard symbol may be configured or may not be configured based on the UE capability information, and the specific number may be based on an integer of 0 or more.

According to the UE capability information transmission step, the operation of transmitting, by the UE (100/200 in FIGS. 12 to 16), UE capability information related to whether to configure a guard symbol to the base station (100/200 in FIGS. 12 to 16) may be implemented by the apparatus of FIGS. 12 to 16. For example, referring to FIG. 13, the one or more processors 102 may control the one or more transceivers 106 and/or the one or more memories 104 to transmit the UE capability information related to whether to configure the guard symbol to the base station 200.

In S1020, the UE transmits an SRS to the base station.

The SRS is transmitted in symbols except a specific number of guard symbols among symbols within a region in which the SRS is configured.

According to S1020, the operation of transmitting, by the UE (100/200 in FIGS. 12 to 16), an SRS to the base station (100/200 in FIGS. 12 to 16) may be implemented by the apparatus of FIGS. 12 to 16. For example, referring to FIG. 13, the one or more processors 102 may control the one or more transceivers 106 and/or the one or more memories 104 to transmit an SRS to the base station 200.

Hereinafter, the aforementioned embodiments are specifically described with reference to FIG. 11 in terms of an operation of a base station. The following described methods are only for convenience of description, and some elements of any one method may be substituted with some elements of another method and may be mutually combined and applied.

FIG. 11 is a flowchart for describing a method of receiving, by a base station, a sounding reference signal in a wireless communication system according to another embodiment of the present disclosure.

Referring to FIG. 11, a method of receiving, by a base station, a sounding reference signal in a wireless communication system according to another embodiment of the present disclosure may include an SRS configuration information transmission step S1110 and an SRS reception step S1120.

In S1110, the base station transmits, to a UE, configuration information related to the transmission of a sounding reference signal (SRS).

According to an embodiment, the SRS may be configured in a region comprised of at least one symbol other than the last symbol of a subframe. The SRS may be based on an additional SRS.

The region may include a specific number of guard symbols. The guard symbol may be related to at least one of frequency hopping or antenna switching of the SRS. The present embodiment may be based on Proposal 1 or Proposal 2.

According to an embodiment, the specific number may be determined based on at least one of the frequency hopping or the antenna switching. For example, the guard symbol may be configured between symbols in which the frequency hopping is performed or between symbols in which the antenna switching is performed.

According to an embodiment, the transmission number of the SRS may be determined based on a factor related to the repetition of the SRS and a specific symbol index.

The present embodiment may be based on Proposal 5. Specifically, the transmission number of the SRS may be $n_{SRS}$ in Proposal 5, the factor may be a repetition factor R, and the specific symbol index may be I'.

The specific symbol index may be related to symbols except the specific number of guard symbols among symbols within the region. Specifically, the specific symbol index may be based on an SRS symbol index re-indexed based on symbols in which the SRS is transmitted in the region in which the SRS is configured.

The frequency hopping or the antenna switching may be performed based on the transmission number. For example, the frequency hopping may be performed based on the transmission number being increased.

The frequency hopping may be performed earlier than the antenna switching. The antenna switching may be performed based on at least one of the transmission number or the number of the frequency hopping performed on a bandwidth in which the transmission of the SRS is configured.

Specifically, an antenna port in which the SRS is transmitted is changed by the antenna switching. An index $a(n_{SRS})$ of the antenna port in which the SRS is transmitted may be changed based on the transmission number $n_{SRS}$ and a number of hops (i.e., a frequency hopping number) taken to full cover an SRS bandwidth configured by changing a frequency band by a hopping bandwidth. That is, $a(n_{SRS})$ may be determined based on a value obtained by dividing the transmission number by the number of the frequency hopping performed on a bandwidth in which the transmission of the SRS is configured. Accordingly, the antenna port can be identically maintained by the number of hops taken to fully cover the configured SRS bandwidth.

According to an embodiment, the configuration information may include information related to the region. The information related to the region may include information on at least one of the number of symbols or a location of a symbol. The present embodiment may be based on at least one of Proposal 2, Proposal 3 or Proposal 4.

The number of symbols or the location of the symbol may be related to at least one of a symbol in which the SRS is transmitted or a guard symbol.

For example, the location of the symbol may be based on a starting symbol index. The number of symbols may be based on the number of symbols across the region. In this case, the number of symbols may include the number of guard symbols and the number of symbols in which the SRS is transmitted. That is, the number of symbols may be based on the sum of the number of guard symbols and the number of symbols in which the SRS is transmitted.

According to S1110, the operation of transmitting, by the base station (100/200 in FIGS. 12 to 16), configuration information related to the transmission of the sounding reference signal (SRS) to the UE (100/200 in FIGS. 12 to 16) may be implemented by the apparatus of FIGS. 12 to 16. For example, referring to FIG. 13, the one or more processors 202 may control one or more transceivers 206 and/or one or more memories 204 to transmit configuration information related to the transmission of the sounding reference signal (SRS) to the UE 100.

The method may further include a base station capability information reception step prior to S1110. In the base station capability information reception step, the base station may receive, from the UE, UE capability information related to whether to configure a guard symbol. The base station capability information may be based on Proposal 1.

The base station capability information may indicate whether a guard symbol needs to be configured. Whether to configure the guard symbol may be determined based on the UE capability information. The guard symbol may be configured or not configured based on the UE capability information. The specific number may be based on an integer of 0 or more.

According to the UE capability information reception step, the operation of receiving, by the base station (100/200 in FIGS. 12 to 16), UE capability information related to whether to configure a guard symbol from the UE (100/200 in FIGS. 12 to 16) may be implemented by the apparatus of FIGS. 12 to 16. For example, referring to FIG. 13, the one or more processors 202 may control the one or more transceivers 206 and/or the one or more memories 204 to receive UE capability information related to whether to configure a guard symbol from the UE 100.

In S1120, the base station receives an SRS from the UE.

The SRS is transmitted in symbols except a specific number of guard symbols among symbols within a region in which the SRS is configured.

According to S1120, the operation of receiving, by the base station (100/200 in FIGS. 12 to 16), an SRS from the UE (100/200 in FIGS. 12 to 16) may be implemented by the apparatus of FIGS. 12 to 16. For example, referring to FIG. 13, the one or more processors 202 may control the one or more transceivers 206 and/or the one or more memories 204 to receive an SRS from the UE 100.

Example of Communication System Applied to Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 12 illustrates a communication system 1 applied to the disclosure.

Referring to FIG. 12, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Example of Wireless Device Applied to the Disclosure

FIG. 13 illustrates wireless devices applicable to the disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Disclosure

FIG. 14 illustrates a signal process circuit for a transmission signal.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG. 13.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Disclosure

FIG. 15 illustrates another example of a wireless device applied to the disclosure.

The wireless device may be implemented in various forms according to a use-case/service (refer to FIG. 12). Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 12), the vehicles (100*b*-1 and 100*b*-2 of FIG. 12), the XR device (100*c* of FIG. 12), the hand-held device (100*d* of FIG. 12), the home appliance (100*e* of FIG. 12), the IoT device (100*f* of FIG. 12), a digital broadcast terminal, a hologram device, a public safety device, an MTC device, a medicine device, a Fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Disclosure

FIG. 16 illustrates a hand-held device applied to the disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 16, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Effects of the method and apparatus for transmitting and receiving sounding reference signals in a wireless communication system according to embodiments of the present disclosure are described as follows.

According to an embodiment of the present disclosure, a region in which the transmission of an SRS is configured includes a specific number of guard symbols. The guard symbol may be related to at least one of frequency hopping or antenna switching. The ambiguity of a UE operation through a configuration of a guard symbol can be removed if frequency hopping and antenna switching operation is configured. Furthermore, there are effects in that an SRS capacity can be guaranteed from a multi-UE viewpoint and SRS-transmittable ranges between UEs are not invaded.

According to an embodiment of the present disclosure, the transmission number of the SRS may be determined based on a factor related to the repetition of an SRS and a specific symbol index. The specific symbol index may be related to symbols except a specific number of guard symbols among symbols within the region. Frequency hopping or antenna switching may be performed based on the transmission number. The frequency hopping may be performed earlier than the antenna switching. The antenna switching may be performed based on at least one of the transmission number or the number of the frequency hopping performed on a bandwidth in which the transmission of the SRS is configured.

Accordingly, frequency hopping or antenna switching may be performed based on the transmission number of an SRS. Furthermore, the accuracy of DL CSI acquisition can be improved because an antenna switching operation is maintained with the same antenna port while frequency hopping is performed in association with the number of the frequency hopping. A guard symbol attributable to antenna switching can be minimized and the waste of resources can be reduced because the frequency hopping/repetition operation is completed prior to antenna switching.

According to an embodiment of the present disclosure, UE capability information related to the configuration of a guard symbol may be transmitted. Whether to configure a guard symbol may be determined based on the capability of a corresponding UE. Accordingly, resources can be reduced because a guard symbol is not configured with respect to a UE having a poor capability, and the deterioration of an SRS transmission symbol attributable to a power transient period can be prevented because a guard symbol is configured with respect to a UE not having a poor capability.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

The invention claimed is:

1. A method of transmitting, by a user equipment (UE), a sounding reference signal (SRS) in a wireless communication system, the method comprising:

transmitting information on UE capability related to a frequency hopping of the SRS and an antenna switching of the SRS;

receiving configuration information related to transmission of a sounding reference signal (SRS); and transmitting the SRS, wherein the SRS is configured in a region comprised of at least one symbol other than a last symbol of a subframe, wherein the region is configured based on i) a starting symbol index and ii) a number of symbols, wherein the region includes at least one guard symbol of a specific number, wherein the at least one guard symbol is related to at least one of i) the frequency hopping of the SRS or ii) the antenna switching of the SRS, based on the UE capability, wherein a transmission number of the SRS is determined based on i) a factor related to a repetition of the SRS and ii) a specific symbol index, and wherein, based on that the transmission of the SRS is based on the frequency hopping of the SRS and the antenna switching of the SRS, an index of an antenna related to the transmission of the SRS is determined based on a value obtained by dividing the transmission number of the SRS by a number of frequency hops in the frequency hopping of the SRS.

2. The method of claim 1,
wherein the specific number is determined based on at least one of i) the frequency hopping of the SRS or ii) the antenna switching of the SRS.

3. The method of claim 1,
wherein the specific symbol index is related to symbols except the specific number of the at least one guard symbol among symbols based on the number of symbols.

4. The method of claim 1,
wherein the frequency hopping of the SRS or the antenna switching of the SRS is performed based on the transmission number of the SRS.

5. The method of claim 4,
wherein the frequency hopping of the SRS is performed earlier than the antenna switching.

6. The method of claim 5,
wherein the antenna switching is performed based on at least one of i) the transmission number of the SRS or ii) the number of frequency hops in the frequency hopping performed on a bandwidth in which the transmission of the SRS is configured.

7. The method of claim 1,
wherein the configuration information includes information for at least one of i) the starting symbol index or ii) the number of symbols.

8. The method of claim 7,
wherein the number of symbols is related to at least one of i) a symbol in which the SRS is transmitted or ii) the guard symbol.

9. The method of claim 1, further comprising transmitting UE capability information related to whether to configure the guard symbol.

10. A user equipment (UE) configured to transmit a sounding reference signal (SRS) in a wireless communication system, the UE comprising:
one or more transceivers;
one or more processors configured to control the one or more transceivers; and
one or more memories operably connected to the one or more processors and storing instructions which, when executed by the one or more processors, configure the one or more processors to perform operations, wherein the operations comprise:
transmitting information on UE capability related to a frequency hopping of the SRS and an antenna switching of the SRS;
receiving configuration information related to transmission of a sounding reference signal (SRS); and
transmitting the SRS,
wherein the SRS is configured in a region comprised of at least one symbol other than a last symbol of a subframe,
wherein the region is configured based on i) a starting symbol index and ii) a number of symbols,
wherein the region includes at least one guard symbol of a specific number, wherein the at least one guard symbol is related to at least one of i) the frequency hopping of the SRS or ii) the antenna switching of the SRS, based on the UE capability,
wherein a transmission number of the SRS is determined based on i) a factor related to a repetition of the SRS and ii) a specific symbol index, and
wherein, based on that the transmission of the SRS is based on the frequency hopping of the SRS and the antenna switching of the SRS, an index of an antenna related to the transmission of the SRS is determined based on a value obtained by dividing the transmission number of the SRS by a number of frequency hops in the frequency hopping of the SRS.

11. A method of receiving, by a base station, a sounding reference signal (SRS) in a wireless communication system, the method comprising:
receiving information on user equipment capability (UE capability) related to a frequency hopping of the SRS and an antenna switching of the SRS;
transmitting configuration information related to a transmission of a sounding reference signal (SRS); and
receiving the SRS,
wherein the SRS is configured in a region comprised of at least one symbol other than a last symbol of a subframe,
wherein the region is configured based on i) a starting symbol index and ii) a number of symbols,
wherein the region includes at least one guard symbol of a specific number,
wherein the at least one guard symbol is related to at least one of i) the frequency hopping of the SRS or ii) the antenna switching of the SRS, based on the UE capability,
wherein a transmission number of the SRS is determined based on i) a factor related to a repetition of the SRS and ii) a specific symbol index, and
wherein, based on that the transmission of the SRS is based on the frequency hopping of the SRS and the antenna switching of the SRS, an index of an antenna related to the transmission of the SRS is determined based on a value obtained by dividing the transmission number of the SRS by a number of frequency hops in the frequency hopping of the SRS.

* * * * *